United States Patent
Riddle et al.

(10) Patent No.: US 9,734,381 B2
(45) Date of Patent: Aug. 15, 2017

(54) SYSTEM AND METHOD FOR EXTRACTING TWO-DIMENSIONAL FINGERPRINTS FROM HIGH RESOLUTION THREE-DIMENSIONAL SURFACE DATA OBTAINED FROM CONTACTLESS, STAND-OFF SENSORS

(71) Applicant: Northrop Grumman Systems Corporation, Falls Church, VA (US)

(72) Inventors: Jack G. Riddle, Columbia, MD (US); Timothy M. Brucks, Westminster, MD (US); Michael M. Becker, Mount Airy, MD (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 131 days.

(21) Appl. No.: 14/573,599

(22) Filed: Dec. 17, 2014

(65) Prior Publication Data
US 2016/0180142 A1    Jun. 23, 2016

(51) Int. Cl.
*G06K 9/00* (2006.01)
*G06K 9/03* (2006.01)

(52) U.S. Cl.
CPC ....... *G06K 9/00033* (2013.01); *G06K 9/0008* (2013.01); *G06K 9/00375* (2013.01); *G06K 9/036* (2013.01); *G06K 9/00201* (2013.01)

(58) Field of Classification Search
None
See application file for complete search history.

(56) References Cited

U.S. PATENT DOCUMENTS

| | | | |
|---|---|---|---|
| 6,810,141 B2 * | 10/2004 | Barbour | G01J 9/00 382/103 |
| 7,606,395 B2 | 10/2009 | Hauke et al. | |
| 7,609,865 B2 | 10/2009 | Chen | |
| 7,623,685 B2 | 11/2009 | Boult et al. | |
| 2006/0039048 A1 | 2/2006 | Carver et al. | |
| 2007/0183653 A1 * | 8/2007 | Medioni | G06K 9/00208 382/154 |

(Continued)

FOREIGN PATENT DOCUMENTS

JP    2006172258 A    6/2006

OTHER PUBLICATIONS

3D Touchless Fingerprints: Compatibility With Legacy Rolled Images. Yi Chen1, Geppy Parziale2, Eva Diaz-Santana2, and Anil K Jain. 2006.*

(Continued)

*Primary Examiner* — Delomia L Gilliard
(74) *Attorney, Agent, or Firm* — Andrews Kurth Kenyon LLP; Sean S. Wooden

(57) ABSTRACT

Disclosed herein are systems and methods for extracting two-dimensional fingerprints from high resolution three-dimensional surface data obtained from contactless, stand-off sensors. The system may include a three-dimensional sensor that generates three-dimensional surface data of a hand and one or more fingers of a subject and a processor, coupled to the three-dimensional sensor, and a memory associated with the processor, in which the processor executes instructions stored in the memory collect three-dimensional surface data of the subject hand and one or more subject fingers generated by the three-dimensional sensor, estimate a hand pose of the subject based on the collected three-dimensional surface data, unroll one or more two-dimensional fingerprints from the extracted fingerprint information, determine a fingerprint quality score for each of the one or more two-dimensional fingerprints and for each of the one or more two-dimensional fingerprints that have a sufficiently high determined fingerprint quality score, store the two-dimensional fingerprint.

24 Claims, 15 Drawing Sheets

(56) References Cited

U.S. PATENT DOCUMENTS

| | | | |
|---|---|---|---|
| 2008/0101664 A1 | 5/2008 | Perez | |
| 2009/0245591 A1 | 10/2009 | Rowe et al. | |
| 2010/0020157 A1 | 1/2010 | Jelinek et al. | |
| 2011/0064282 A1* | 3/2011 | Abramovich | G06K 9/00033 382/124 |
| 2011/0134220 A1* | 6/2011 | Barbour | H04N 13/0207 348/44 |
| 2012/0076369 A1* | 3/2012 | Abramovich | G06K 9/00033 382/124 |
| 2015/0161460 A1* | 6/2015 | Paul | G06F 21/32 382/115 |
| 2015/0347833 A1* | 12/2015 | Robinson | G01B 11/25 348/77 |
| 2016/0019673 A1* | 1/2016 | Sakamoto | G06K 9/00013 382/124 |
| 2016/0063294 A1* | 3/2016 | Du | G06K 9/0002 382/124 |
| 2016/0162673 A1* | 6/2016 | Kutliroff | G06F 21/32 382/115 |

OTHER PUBLICATIONS

Weickert, J. 1998. "Anisotropic Diffusion in Image Processing." Ph.D. Thesis, Dept. of Mathematics, University of Kaiserslautern,Germany, pp. 42-43, 80-82, 107.

Hong, L, Wan, Y., and Jain, A. K., "Fingerprint image enhancement: Algorithm and performance evaluation." IEEE Transactions on Pattern Analysis and Machine Intelligence 20, 8 (1998), pp. 777-789.

Yi Chen, Geppy Parziale, Eva Diaz-Santana, and Anil K. Jain, "3D Touchless Fingerprints: Compatibility with Legacy Rolled Images," in Proc. of Biometric Symposium, Biometric Consortium Conference, Baltimore, MD, Sep. 2006.

"TBS Biometrics" (descriptive webpages), www.tbs-biometrics.com/en, 2014.

Wang, Y., Hao, Q., Fatehpuria, A., Hassebrook, L., Lau, D., "Data Acquisition and Quality Analysis of 3-Dimensional Fingerprints," in IEEE conference on Biometrics, Identity and Security, Tampa, Florida, (2009).

"Flash Scan 3D Contactless Fingerprint Sensor" (descriptive webpages), www.flashscan3d.com, 2013.

"NIST Biometric Image Software" (descriptive webpage), www.nist.gov/itl/iad/ig/nbis.cfm, May 14, 2010.

"American National Standard for Information Systems—Data Formats for the Interchange of Fingerprint, Facial, & Other Biometric Information", ANSI/NIST-ITL Jan. 2007, NIST Special Publication 500-271.

"User's Guide to NIST Biometrics Image Software ("NBIS")," technical report NISTIR 6813, NIST—Watson et al., 2008.

* cited by examiner

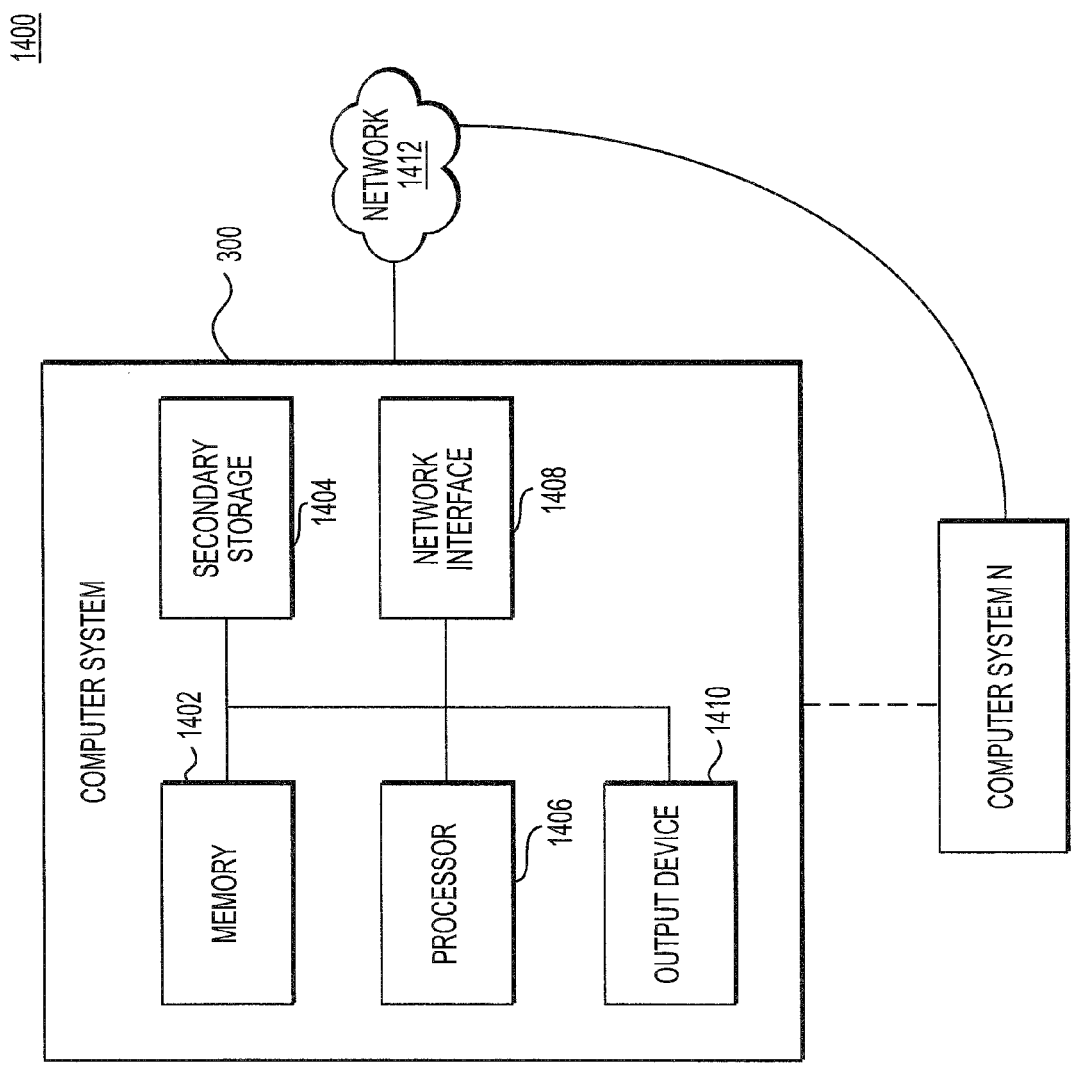

SYSTEM AND METHOD FOR EXTRACTING TWO-DIMENSIONAL FINGERPRINTS FROM HIGH RESOLUTION THREE-DIMENSIONAL SURFACE DATA OBTAINED FROM CONTACTLESS, STAND-OFF SENSORS

BACKGROUND

Current fingerprint collection procedures have a number of drawbacks. Collecting ink prints is a messy and time consuming procedure often resulting in smearing. This lowers the fingerprint quality which significantly degrades matching performance.

U.S. Government agencies and the private sector have a need to rapidly capture a subject's fingerprints for identification or screening purposes, especially when processing large groups. This need for rapid collection as well as scenarios for first responders constrained by environmental or medical considerations dictate that the fingerprint collection uses a contactless means. Currently existing two-dimensional ("2D") fingerprint scanners significantly lower fingerprint collection times, however they require the subject to touch a mechanism. Touch sensors are impractical and unsafe for emergency first responder operational scenarios.

Currently existing three-dimensional ("3D") fingerprint scanners are capable of collecting at very limited standoff distances (contactless); however, these systems generate 3D fingerprint data using 2D images captured from multiple cameras surrounding the finger. As such, these systems are not robust to discoloration of the subject's fingertips and can be easily deceived by presenting the scanner with a fake 2D fingerprint image. Also, systems do not extract 2D fingerprint images from true 3D depth information.

Spatial phase imaging sensors are a recent breakthrough that allow the collection of high resolution mesh data on the fingertips. However, no known prior algorithms exist to extract 2D fingerprint from the mesh data alone.

An existing method for standoff 2D fingerprint extraction from 3D-like data operates by processing 2D images collected from multiple known camera views. Indeed, there are several existing methods for standoff 2D fingerprint extraction from 3D-like data. Both TBS Inc.'s and Anil Jain's approach operate by processing 2D images collected from multiple known camera views. These approaches are limited to single fingerprint collection and are quite different from the algorithms described in this document. Furthermore, both approaches require that single fingers are inserted into a cavity that is surrounded by cameras, offering limited standoff distances while imposing significant constraints on the subject being fingerprinted.

Flash Scan 3D Inc.'s and Daniel Lau's approach both employ a Structure Light Illumination (SLI) method for capturing 3D fingerprints from a single aperture camera. These non-contact 3D scanning systems use multiple digital cameras along with a DLP projector and claim to have the capability to capture all five fingers and palm prints in a single image collection. However, research into their approaches suggests that they are currently not able to image whole hand data with a single image collection.

The above techniques suffer quite a few drawbacks and are quite different from the embodiments described in this application. For example, these existing techniques are not robust to discoloration of the subject fingertips and deception methods such as presenting the system with a fake 2D fingerprint image.

SUMMARY

Embodiments described herein overcome the disadvantages of the prior art. These and other advantages are provided by a system for extracting two-dimensional fingerprints from high resolution three-dimensional surface data obtained from contactless, stand-off sensors. The system may include a three-dimensional sensor that generates three-dimensional surface data of a hand and one or more fingers of a subject and a processor, coupled to the three-dimensional sensor, and a memory associated with the processor, in which the processor executes instructions stored in the memory collect three-dimensional surface data of the subject hand and one or more subject fingers generated by the three-dimensional sensor, estimate a hand pose of the subject based on the collected three-dimensional surface data, based on the estimated hand pose, extract fingerprint information from the collected three-dimensional surface data; unroll one or more two-dimensional fingerprints from the extracted fingerprint information, determine a fingerprint quality score for each of the one or more two-dimensional fingerprints and for each of the one or more two-dimensional fingerprints that have a sufficiently high determined fingerprint quality score, store the two-dimensional fingerprint.

These and other advantages are also provided by a method for extracting two-dimensional fingerprints from high resolution three-dimensional surface data obtained from contactless, stand-off sensors. The method includes generating three-dimensional surface data of a hand and one or more fingers of a subject using a three-dimensional sensor, collecting three-dimensional surface data of the subject hand and one or more subject fingers generated by the three-dimensional sensor, estimating a hand pose of the subject based on the collected three-dimensional surface data, based on the estimated hand pose, extracting fingerprint information from the collected three-dimensional surface data, unrolling one or more two-dimensional fingerprints from the extracted fingerprint information, determining a fingerprint quality score for each of the one or more two-dimensional fingerprints, and for each of the one or more two-dimensional fingerprints that have a sufficiently high determined fingerprint quality score, storing the two-dimensional fingerprint.

BRIEF DESCRIPTION OF THE DRAWINGS

Embodiments of a system and method for extracting two-dimensional fingerprints from high resolution three-dimensional surface data obtained from contactless, stand-off sensors are understood and described in conjunction with the following drawings, wherein:

FIG. 14 is a block diagram illustrating computer system components of an embodiment of a system for extracting two-dimensional fingerprints from high resolution three-dimensional surface data obtained from contactless, stand-off sensors.

DETAILED DESCRIPTION

Figure 1:
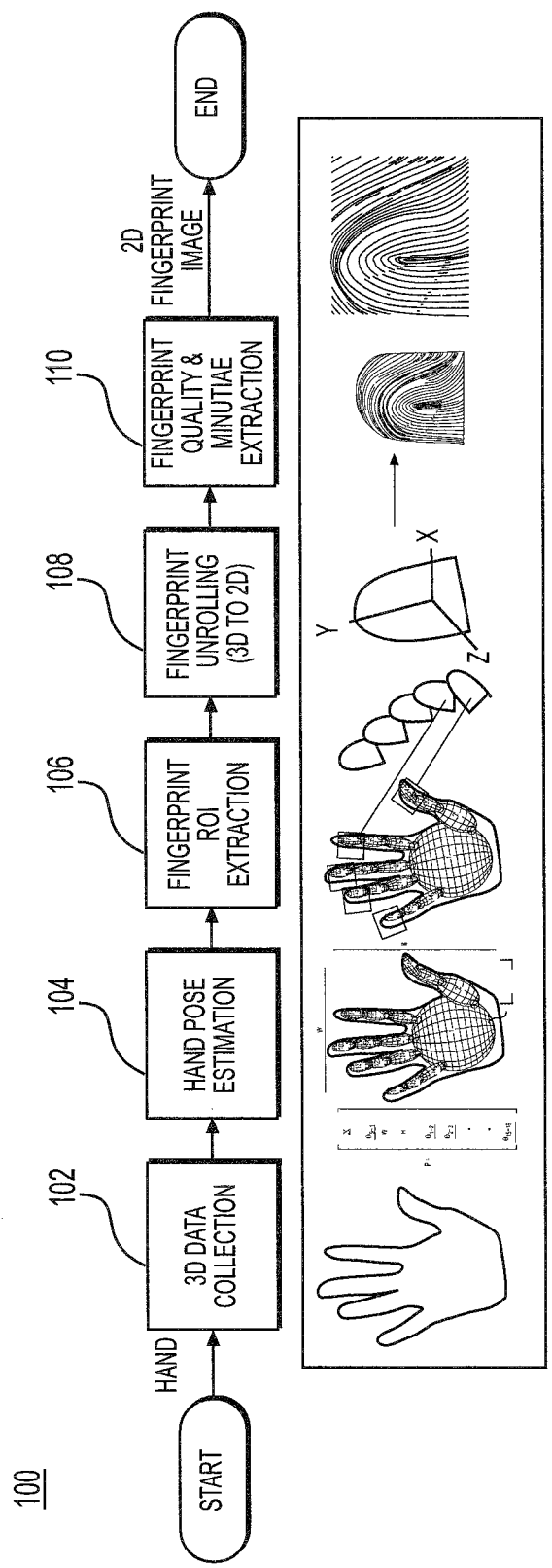
FIG. 1 is a flow diagram illustrating an embodiment of a method for extracting two-dimensional fingerprints from high resolution three-dimensional surface data obtained from contactless, stand-off sensors.

Described herein are embodiments of a system and method for extracting two-dimensional fingerprints from high resolution three-dimensional surface data obtained from contactless, stand-off sensors. The disclosed system is an innovative and flexible approach that combines advanced imaging technology with state-of-the-art computer vision algorithms to collect fingerprints using a contactless means. Embodiments provide an autonomous system for extracting fingerprints. Embodiments of the system provide numerous advantages over current and alternative approaches to fingerprint collection. For example, embodiments of the disclosed system:

Capture multiple fingerprints with a single image collection;

Allow the subject to be at a distance from the sensor that minimizes the probability of sensor contact/contamination;

Impose little constraint on the subject (i.e., collect fingerprint data as long as enough finger tips face the sensor);

Allow for high volume use; embodiments are significantly faster than traditional ink collection and are faster and more flexible than single digit contactless collection systems;

Capture the 3D shape and structure of the entire hand; this data is available for further processing and exploitation and could be useful as an additional biometric feature;

Extract ridge and valley information of the fingertips from true 3D depth information, making the system robust to (i) discoloration (e.g., ink on the finger) of the subject's fingertips and (ii) deception methods;

Ensure sensor independence as long as the collection sensor generates and supplies high resolution 3D mesh data to the system; and Enhance fingerprint images which significantly increases fingerprint matching performance.

Embodiments provide a novel system for autonomous extraction of 2D fingerprint images from high resolution 3D surface data captured via a contactless sensor at standoff distances. The resulting 2D fingerprint images provide continuous, high-contrast ridges and valleys with suitable resolution required for accurate fingerprint matching (against existing and future databases). Additionally, embodiments preserve the relative distances between fingerprint minutiae, consequently providing compatibility with current Automatic Fingerprint Identification System (AFIS) interface standards.

U.S. Government agencies and the private sector have a need to rapidly capture a subject's fingerprints for identification or screening purposes, especially when processing large groups. This need for rapid collection as well as scenarios for first responders constrained by environmental or medical considerations dictate that the fingerprint collection uses a contactless means. Embodiments of the disclosed system may be deployed to support the first responder community after a natural disaster, major accident, or terrorist act as well as the routine screening or controlled checkpoint environments. Embodiments also provide a means for rapid high resolution contactless fingerprint collection and matching that is both robust to discoloration and common deception methods Fingerprint data collected in the form of a 3D high resolution mesh will only be of practical value within the current infrastructure if the 3D surface data can be transformed into 2D fingerprint images in such a way that the high contrast ridges and valleys of the fingerprint are preserved. In order to be compatible with current AFIS interface standards, a contactless fingerprint collection and processing system must also preserve the relative distances between fingerprint minutiae and generate images with the appropriate resolution needed. The disclosed system provides this capability.

Embodiments described herein collect whole hand data in a single image collection and extract the ridges and valleys of the fingertips from true 3D depth information, making the system robust to discoloration of the subject fingertips and deception methods such as presenting the system with a fake fingerprint image. Furthermore, as opposed to prior art approaches that require that single fingers are inserted into a cavity that is surrounded by cameras, offering limited standoff distances while imposing significant constraints on the subject being fingerprinted, embodiments of the system and method described herein provide whole hand data capture at standoff distances of 1-2 feet.

Some existing systems, such as Flash Scan 3D Inc. and Daniel Lau's approach apply a SLI method for capturing 3D fingerprints. From a fingerprint processing standpoint, these approaches are similar to the disclosed approach. However, a fundamental difference is that the disclosed system determines hand geometry from pose estimation whereas all other approaches do not.

In addition, embodiments utilize a Photon-X 3D camera that offers significant advantages over competing methods to collect 3D data:

- The stereovision used by other systems requires exact and constant distances from a subject with multiple cameras coupled with triangulation algorithms to create 3D stereovision. This approach is sensitive to baseline and, for close objects, can lead to significant distortion when attempting to construct high resolution 3D data;
- SLI approaches use light and shadow on the subject to calculate 3D curvatures. Due to the need for complex algorithms and known lighting positions to limit shadow analysis, SLI approaches are, therefore, not suitable for most real world applications;
- Active sensors that produce range-based data tend to be large and heavy, produce huge amounts of data requiring high-bandwidth data paths, and result in point-cloud data sets where the individual data points have no inherent relation to each other; and
- Other passive range-based sensing techniques tend to forego 3D reproduction of the fingerprint ridge detail, and rely instead on 2D snapshots of the print area. Such snapshots can suffer from distortions due to projective geometry.

The spatial phase technology behind Photon-X's 3D camera addresses these deficiencies in other systems by creating 3D images: 1) from a single line of sight; 2) 24/7 with NPR lighting; 3) at standoff ranges; 4) in a broad spectrum of wavelengths; 5) with slope and other shared properties forming relationships between adjacent data points; and, 6) and all in a small lightweight package.

The contemplated modifications and variations specifically mentioned above and below are considered to be within the spirit and scope of the present invention.

With reference now to FIG. 1, shown is flow diagram providing an overview of an embodiment of method 100 for extracting 2D fingerprint images from high resolution 3D surface data captured via contactless means. Consequently, FIG. 1 illustrates system processing of an embodiment of a system employed to capture fingerprints using a contactless means. Method 100, and system processing, includes five (5) major functional steps used to collect, extract, and process high quality 2D fingerprint images from corresponding high resolution 3D mesh data.

A biometric data acquisition sensor included in embodiment of system is triggered by an ultrasonic range finder which cues the system to the presence of an object (e.g., a hand) in the biometric data acquisition sensor's field of view (FOV). The FOV is primarily determined by the biometric data acquisition sensor used. Method 100 then collects 3D surface or range data and performs an initial screening to verify the hand meets a "liveness" criterion, block 102. The 3D data is exploited to accurately estimate the pose of the hand, block 104 and assess the quality of 3D data collected at each fingertip by computing a score based on the percentage of the fingerprint that is visible (fingertip region of interest (ROI) extraction), block 106. All fingertip regions with an acceptable score are unrolled into 2D fingerprint images, block 108 in order to perform comparisons with existing ink rolled database systems. Finally, a fingerprint quality score is computed for each fingerprint image based on the NIST NFIQ algorithm and poor quality images are rejected, block 110. Fingerprint images of sufficient quality are compressed and stored or transmitted in one of several standard formats (e.g., ANSI/NIST-ITL 1-2007 Type 3 records, baseline JPEG or WSQ20). Note that the embodiments of the disclosed method 100 and system generate automated notifications at several steps in the processing that can provide an alert to an operator or feedback to the subject.

Figure 2:
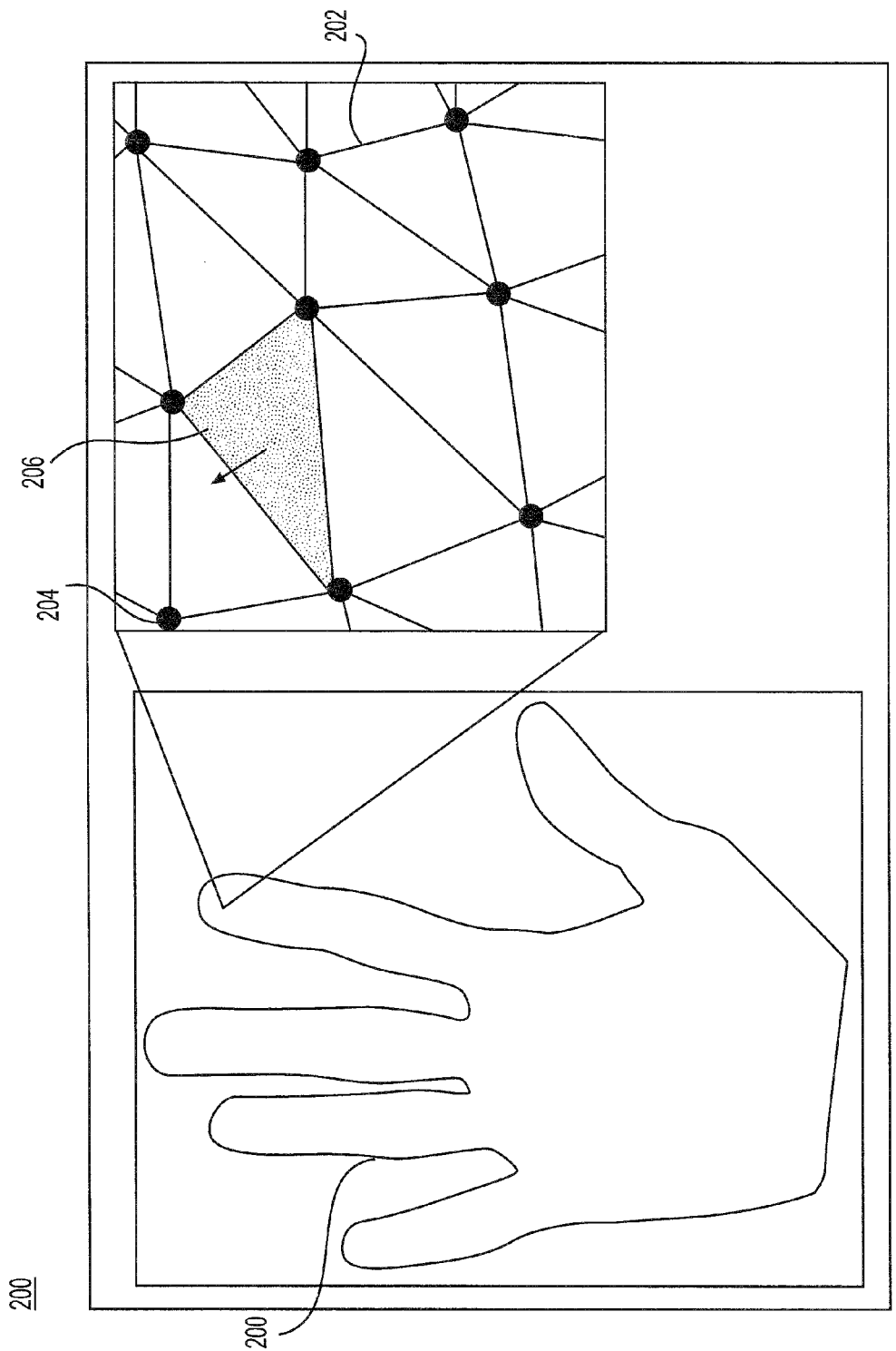
FIG. 2 is a diagram illustrating vertices and triangular facets used for 3D data collection in embodiments of a system and method for extracting two-dimensional fingerprints from high resolution three-dimensional surface data obtained from contactless, stand-off sensors.

With continuing reference to FIG. 1, each major component of the disclosed method 100 and system is explained in further detail below. Acquiring or collecting 102 3D geometric information starts with data acquisition. Data acquisition is typically performed with a range scanner capable of generating a dense set of surface points, where each point samples a 3D position as well as other attributes, such as: surface normal information, color, or material properties. A triangulated, three-dimensional surface model, or mesh, is then generated from this dense point set. With reference now to FIG. 2, shown is diagram illustrating 3D range data collection; as shown, 3D range data collected from a hand 200 provides a description of the surface geometry with sufficient resolution to distinguish the depth differences between ridges and valleys on a fingertip; the surface description is represented using a mesh data structure 202 with numerous point vertices 204 and triangular facets 206. The dots highlight the vertices 204 that compose the triangular facets 206, while the arrow represents the surface normal of the highlighted facet 206.

The data acquisition and mesh generation process described herein can be complex, encompassing several processing steps, each involving choices between sensor modalities and processing techniques depending on specific operational requirements. In order to provide the flexibility for ever-changing operational scenarios and mission requirements, system architecture of embodiments was designed to be sensor independent. Any sensor may be used that can satisfy the following constraints: the sensor shall produce 3D range data as described above; the sensor shall produce this 3D data with at least the minimum resolution required to differentiate between fingerprint ridges and valleys; and, the sensor shall collect and generate this 3D data in a contactless means.

Due to the sensor independent nature of the disclosed processing algorithms, several sensor choices are available depending on the specific operational scenario. A light detection and ranging (LIDAR) system based on Geiger-Mode Avalanche Photo-Diode (GmAPD) technology may be used. Such a LIDAR system would enable embodiments to increase standoff distances while maintaining a high resolution needed for 3D fingerprint collection. There are several techniques present that use multiple digital cameras surrounding the finger to provide a lower cost solution, but these methods offer very minimal standoff distances. Photon-X has developed an approach that can generate the required 3D data using a single-aperture 3D system providing a small form factor that can obtain current standoff distances of about one (1) to two (2) feet. The Photon-X approach is a revolutionary camera-based system that captures spatial phase and spectral information. Using spatial phase and spectral information in the available ambient light, directional cosines are measured for each pixel in the scene. This directional cosine information is used to generate a 3D representation.

Figure 3:
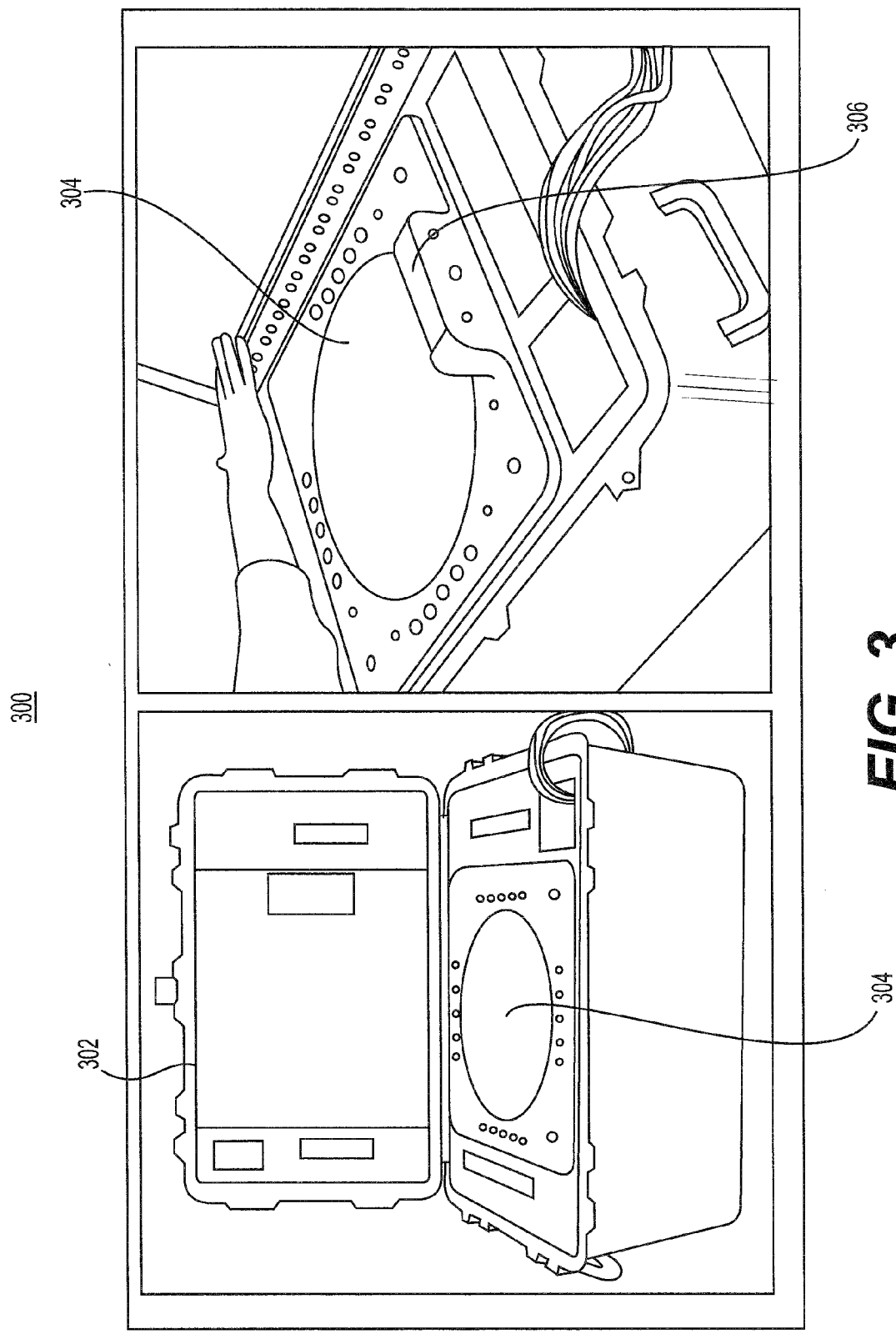
FIG. 3 is a diagram illustrating an embodiment of a system for extracting two-dimensional fingerprints from high resolution three-dimensional surface data obtained from contactless, stand-off sensors.

Embodiments described herein utilize the Photon-X sensor. With reference to FIG. 3, shown is an embodiment of a system 300 for extracting 2D fingerprint images from high resolution 3D surface data captured via contactless means. System 300 includes a transport case 302 that was customized for embodiments. A Photon-X camera (not shown) was integrated into the case 302 beneath a glass cover 304 to provide weather resistance as well as act as a human visual aid for hand placement. A low cost ranging, ultrasonic sensor 306 is integrated onto the side of the glass cover 304 to cue the system to the presence of an object as well as provide range information for accurate hand pose estimation and fingerprint scale determination. An internal processor (not shown) collects the 3D data and range information, executes the disclosed algorithms, and outputs the extracted 2D fingerprint images with quality scores to a display. The processor includes memory and other computing elements associated therewith.

With continuing reference to FIG. 1, if the collected data passes an initial subject screening, a hand pose estimation component proceeds to estimate 104 the pose of the hand. The overall hand pose is then used to determine which 3D fingertips are in cooperative poses that allow for the construction of 2D fingerprint images. The pose also provides the precise location of each fingertip region in the 3D data for subsequent 2D fingerprint image extraction. Detailed descriptions of the initial screening test, hand pose determination, and 3D fingerprint region extraction are provided below.

Because the disclosed system imposes very few constraints on the subject's hand as he/she places it over the system, the subject is free to place his/her hand in any pose. As a result, situations may arise in which the data collected by the disclosed system will be inadequate to accomplish the fingerprint collection task. For example, if the subject places his/her hand upside down, outside the sensor FOV, or at an extreme angle, the data collected in the fingertip regions will not be sufficient. To mitigate this, the system performs an initial screening to recognize (and provide feedback to an operator, if desired) these situations by extracting the 3D contour of the hand from the mesh data and perform a set of initial pose tests. These hand pose estimation 104 tests include locating the thumb in the contour and verifying that the palm is facing towards the sensor, confirming that the contour does not intersect the edge of the FOV except at the wrist, and determining that the contour is mostly flat in the depth dimension. Embodiments utilize the ranging, ultrasonic sensor 306 to ensure that the fingerprints captured by the system are generated from a 3D surface (i.e., the disclosed system cannot be deceived by presenting it a picture of a fingerprint or other similar deception techniques). This also implies that the disclosed system is robust to any discoloration of the fingertip (e.g., ink on the finger).

Figure 4:
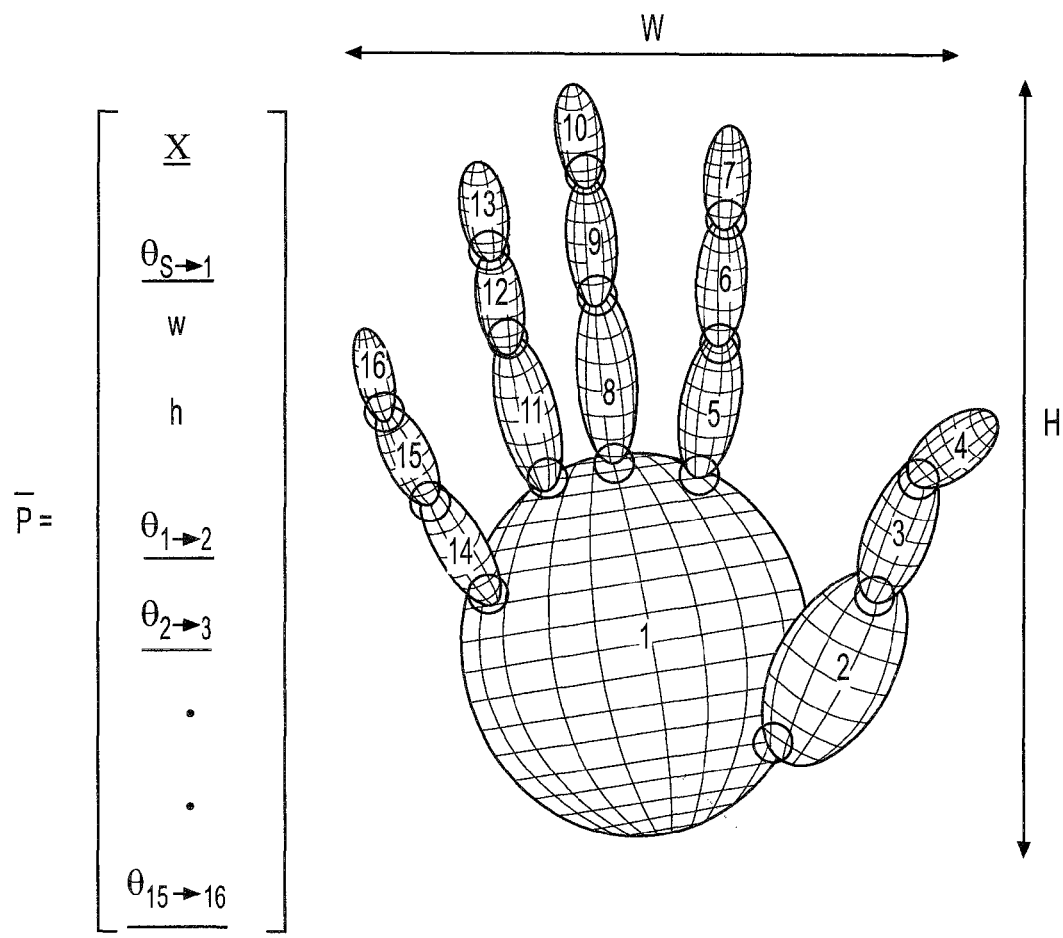
FIG. 4 is a diagram illustrating a model used in a model-based technique for pose estimation in embodiments of a system and method for extracting two-dimensional fingerprints from high resolution three-dimensional surface data obtained from contactless, stand-off sensors.

With reference now to FIG. 4, in an embodiment, a model-based technique is employed for pose estimation 104 where the hand pose is represented by a kinematics model with twenty-nine (29) degrees of freedom and sixteen (16) components. A diagramed model 400 in FIG. 4 illustrates the sixteen components (numbered). The parameters of the model 400 capture the joint angles between each component as well as the global position, orientation and size of the hand. In an embodiment, the shape of each component is represented with a simple geometric shape such as an ellipsoid to expedite the computation of the expected contour (i.e., the edges of the surfaces visible to the sensor).

Given a model, e.g., model 400, of the kinematics and shapes as described above and an observed 3D contour of the hand, a Bayesian approach may be used to determine the parameter values that maximize a likelihood of observation contour given the parameters. The likelihood is computed based on how well the observed contour matches the expected hand contour generated by finding all the tangential points between the 3D object described by parameters to the sensor. The extent of the match can be computed using a simple metric such as the mean square error (MSE) between the points from the expected and observed contours. The below provides an equation that is used by embodiments of the method and system for extracting 2D fingerprint images from high resolution 3D surface data captured via contactless means to determine the likelihood of an observation contour.

$$p(\text{contour} | \overline{P}) = \frac{\sum_{pt_i \in contour} (pt_i - pt_j)^2}{N}$$

In the equation used to determine the likelihood of an observation contour; N represents the number of points in the observed contour, while $pt_j$ is the closest point in the expected contour to $pt_i$.

Finding a maximum a posteriori (MAP) estimate of the model parameters in a high dimensional search space can be challenging, especially when multiple sets of parameter values may generate contours that match reasonably well with the observed contour. Embodiments of the system for extracting 2D fingerprint images from high resolution 3D surface data captured via contactless means utilize a particle filtering approach to efficiently explore the space by representing the probability density with a multi-modal distribution. Additionally, in embodiments, the pose estimation 104 process is simplified by reducing the model dimensionality with known parameters (e.g., the hand position and orientation relative to the sensor may be computed from the range information and the 3D hand contour) and applying constraints on the model (e.g., fingers only bend inward) to reduce search space.

Figure 5:
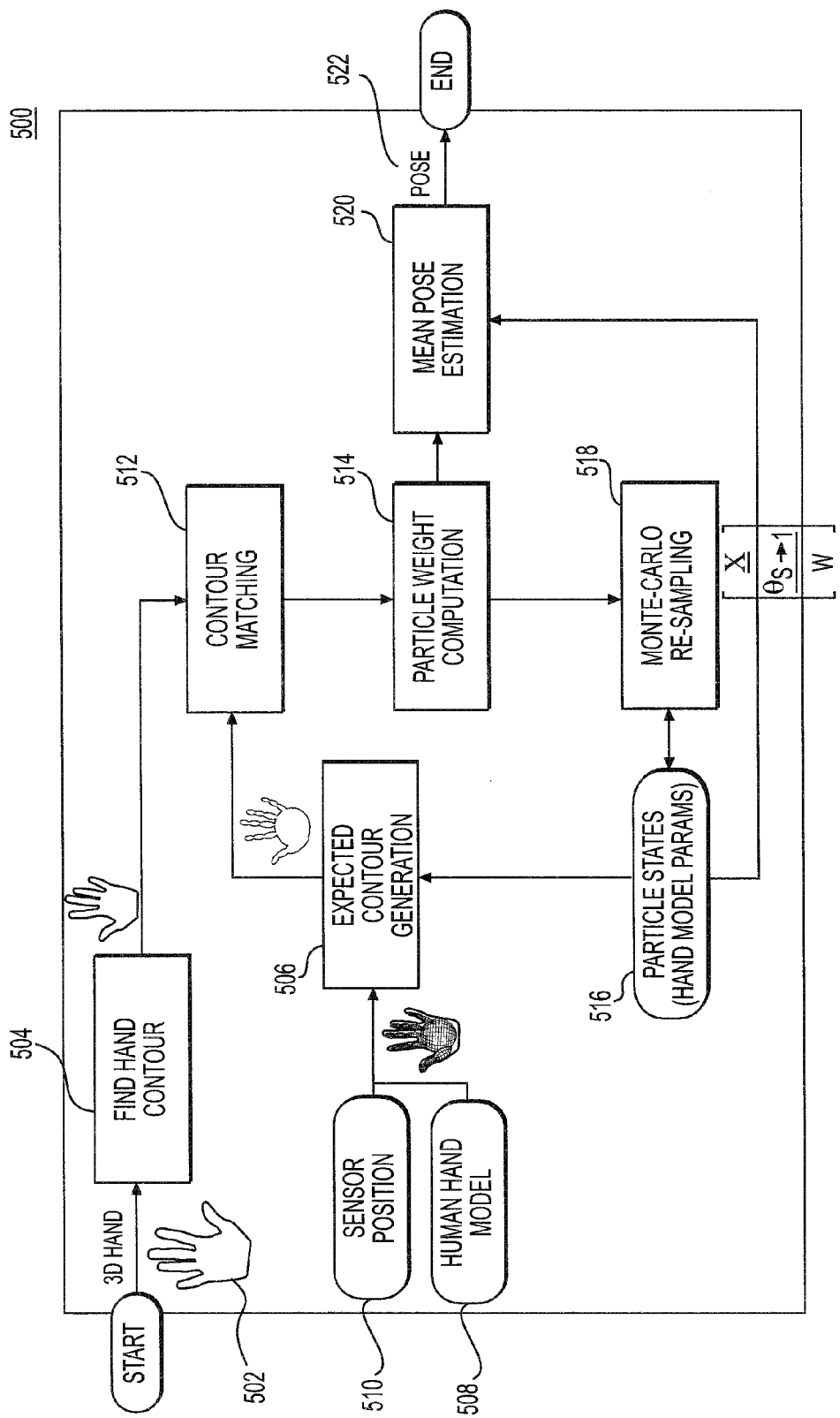
FIG. 5 is a diagram illustrating an embodiment of a process for pose estimation used in embodiments of a system and method for extracting two-dimensional fingerprints from high resolution three-dimensional surface data obtained from contactless, stand-off sensors.

With reference now to FIG. 5, shown is a flow diagram illustrating details of a pose estimation process 500 (e.g., pose estimation 104) utilized in embodiments of a system and method for extracting 2D fingerprint images from high resolution 3D surface data captured via contactless means. The illustrated details show a pose estimation process 500 employed to find a valid pose estimate given an observed 3D hand contour 502. In embodiments using this approach, each particle is a multivariate Gaussian distribution on the set of hand model parameters (e.g., the twenty-nine (29) degrees of freedom in the hand model, as described above); and a specific hand pose is defined by the mean of a particle's distribution (i.e., the particle state).

The 3D hand contour 502 observed by a system sensor is uploaded or generated from the the triangulated surface mesh, block 504. Particles are initialized based on an initial estimate of the location and orientation of the hand relative to the sensor as well as a priori knowledge on the likely poses (e.g., the hands are most likely open). An expected contour is computed, block 506, for each particle based on the particle state (i.e., the hand pose) 508 and the sensor position 510. These expected contours are matched against the observed contour, block 512, and the resulting MSEs, representing the likelihood, are used to compute a normalized weight for each particle, block 514. At this point, a multivariate Gaussian density can be derived from each particle state (i.e., the mean) 516 and the covariance. The covariance representing the uncertainty of the hand pose is computed using training data and it is decreased during the iterative estimation process. The weighted sum of all such densities from each particle provide a multi-modal distribution from which the next set of particle states will be re-sampled, block 518. This process is repeated until the particles have achieved accurate matches with the observed contour or a maximum number of iterations have been run. Upon convergence, the mean pose is calculated, block 520, from the weighted sum of the particle states and returned as the final estimated pose 522.

Once the hand pose 522 is estimated 550, embodiments of the system compute a metric on the potential of the 3D hand data to produce useful fingerprints—see fingerprint ROI extraction 106. Optimal conditions for fingerprint extraction 108 occur when the subject holds his/her hand normal to the camera line of sight with his/her fingers fully extended. Rotating the hand or bending the fingers will change the camera's view of the fingerprints and alter the range data it captures.

Figure 6:
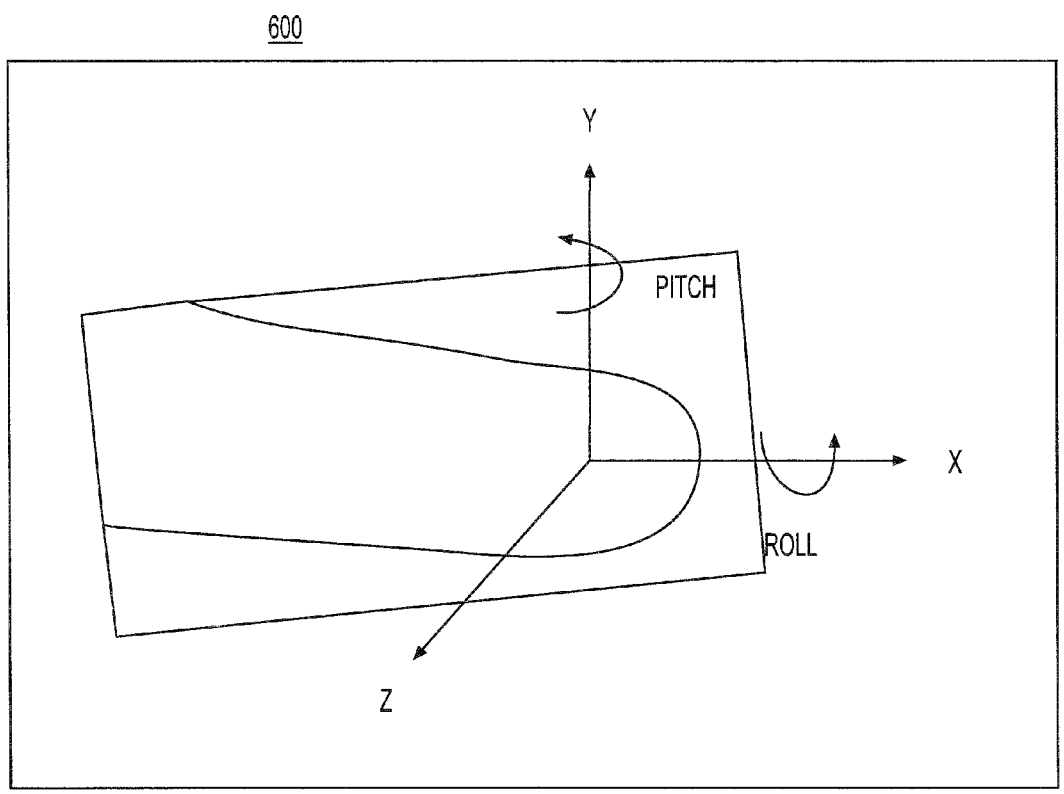
FIG. 6 is a diagram illustrating a fingertip coordinate system used by embodiments of a system and method for extracting 2D fingerprint images from high resolution 3D surface data captured via contactless means.

With reference now to FIG. 6, shown is an illustration of a fingertip coordinate system 600 used by embodiments of a system and method for extracting 2D fingerprint images from high resolution 3D surface data captured via contactless means. The fingertip coordinate system 600 is utilized by the fingerprint ROI extraction 106. The location and orientation of each hand component (such as the fingertips) is calculated from the hand model by transforming the origin and orientation of the component's coordinate system to a point and orientation relative to the sensor camera. For a fingertip region, the local coordinate system is located at the center of the fingertip; the x-axis passes through the tip of the finger, the y-axis passes through the side of the fingertip and the z-axis is pointed towards the sensor. In this coordinate system, roll is defined as the rotation of a component about its x-axis and pitch is defined as the rotation about its y-axis.

Figure 7:
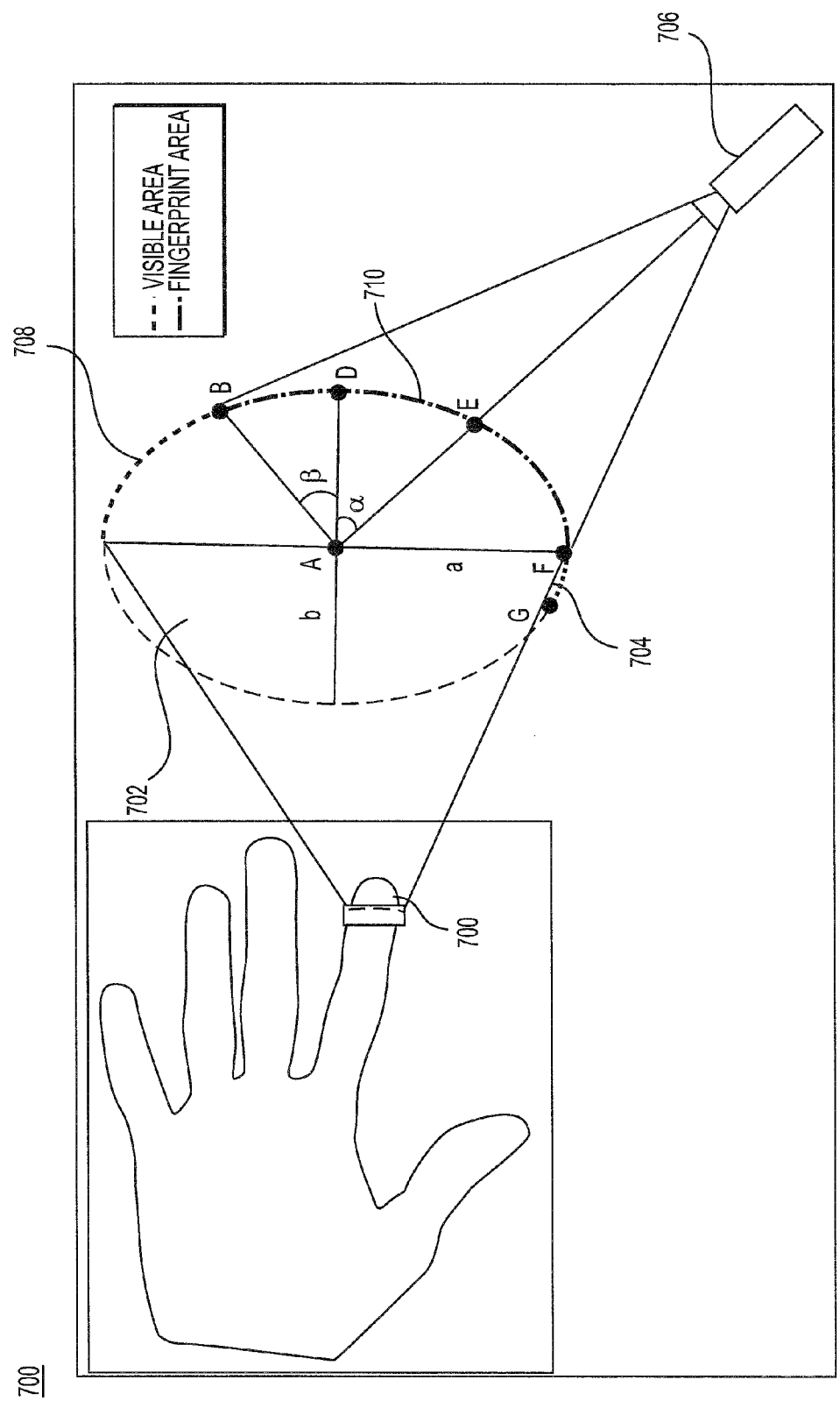
FIG. 7 is a diagram illustrating an embodiment of a process for modeling the visible fingerprint area by an embodiment of a system and method for extracting 2D fingerprint images from high resolution 3D surface data captured via contactless means.

With reference now to FIG. 7, shown is a diagram illustrating a process for modeling the visible fingerprint area by an embodiment of a system and method for extracting 2D fingerprint images from high resolution 3D surface data captured via contactless means. The process for modeling the visible fingerprint area is utilized by the fingerprint ROI extraction 106. Two quantities are used in evaluating the potential of each fingerprint: the visible fingerprint area and the data resolution covering this area. Due to the shape of the finger, the roll angle strongly affects the visible area while the pitch angle primarily affects the number of data points covering this area. The visible fingerprint area can be estimated by modeling a cross section of the fingertip 700 as an ellipse 702 and calculating the length of the elliptical arc located in the camera's field of view. As shown, point A represents the center of the fingertip, alpha (a) represents the roll angle, and an arc 704 from point B to point G represents the visible area of the 3D sensor camera 706. An arc 708 from one end of axis a (point F) to the other end of axis a represents the actual fingerprint area. Hence, the visible fingerprint area is an arc 710 from point B to point F. The data resolution of the visible fingerprint area is estimated by multiplying the given resolution at the fingertip range by the ratio of the observed component length to the actual component length (the cosine of the pitch angle).

The confidence that a finger will produce a useful fingerprint is given by the average of the visible fingerprint area arc 710 length and the estimated data resolution divided by their respective optimal values—as shown by the equation below. The equation below is an equation for the confidence that a finger will produce a useful fingerprint. Candidate fingers with a confidence greater than a specified threshold will have their 3D fingerprint data extracted for further analysis.

$$\text{confidence} = \frac{1}{2} \cdot \left( \frac{\text{visible\_arc}}{\frac{1}{2} \cdot \text{elliptical\_circumference}} + \frac{\text{estimate\_data\_resolution}}{\text{optimal\_data\_resolution}} \right)$$

Fingerprint data collected by the disclosed system will only be of practical value within the current infrastructure if the high resolution 3D data on the fingertips can be transformed to 2D fingerprint images with high contrast ridges and valleys. In order to be compatible with current AFIS, embodiments must preserve the relative distances between fingerprint minutiae and generate images at the appropriate resolution. Once the pose of the subject's hand has been estimated, embodiments operate on each fingertip (that is in a cooperative pose) to generate a 2D fingerprint image that satisfies the above requirements.

Figure 8A:
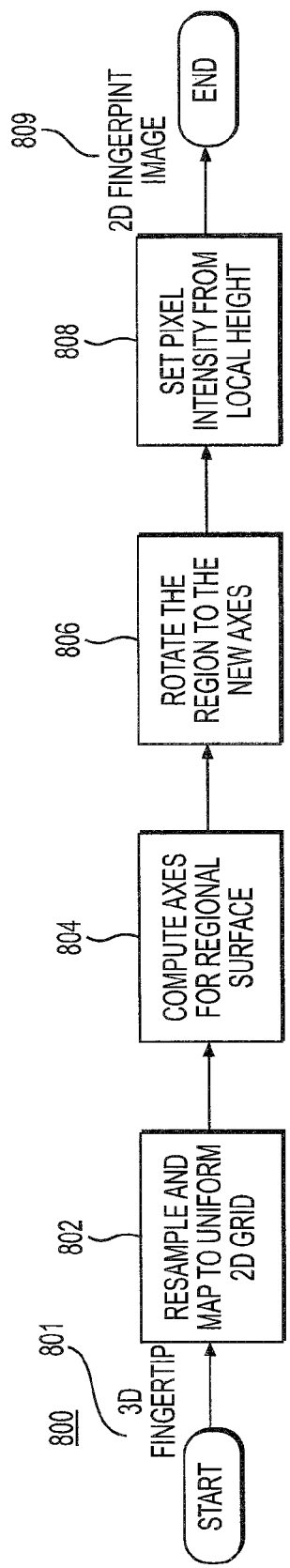
FIG. 8A is a flow diagram illustrating an embodiment of a process for unrolling a 3D fingertip mesh and constructing a 2D fingerprint image used in an embodiment of a system and method for extracting 2D fingerprint images from high resolution 3D surface data captured via contactless means.
Figure 8B:
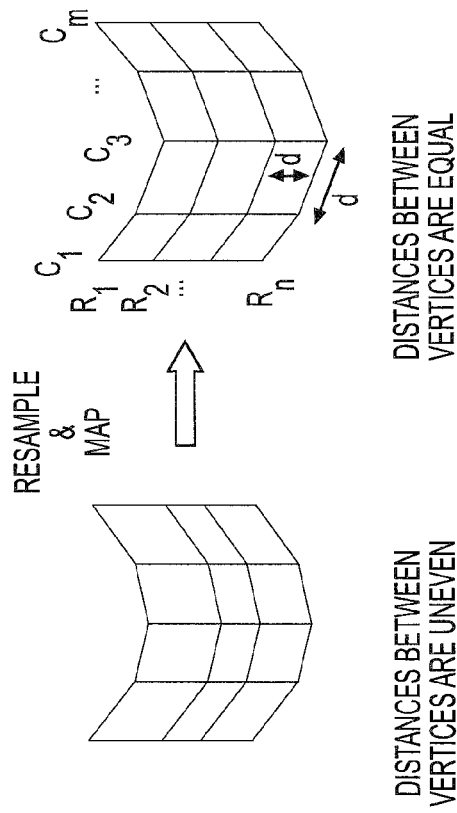
FIGS. 8B-8D are diagrams illustrating results of steps of the process for unrolling a 3D fingertip mesh and constructing a 2D fingerprint image illustrated in FIG. 8A.
Figure 8C:
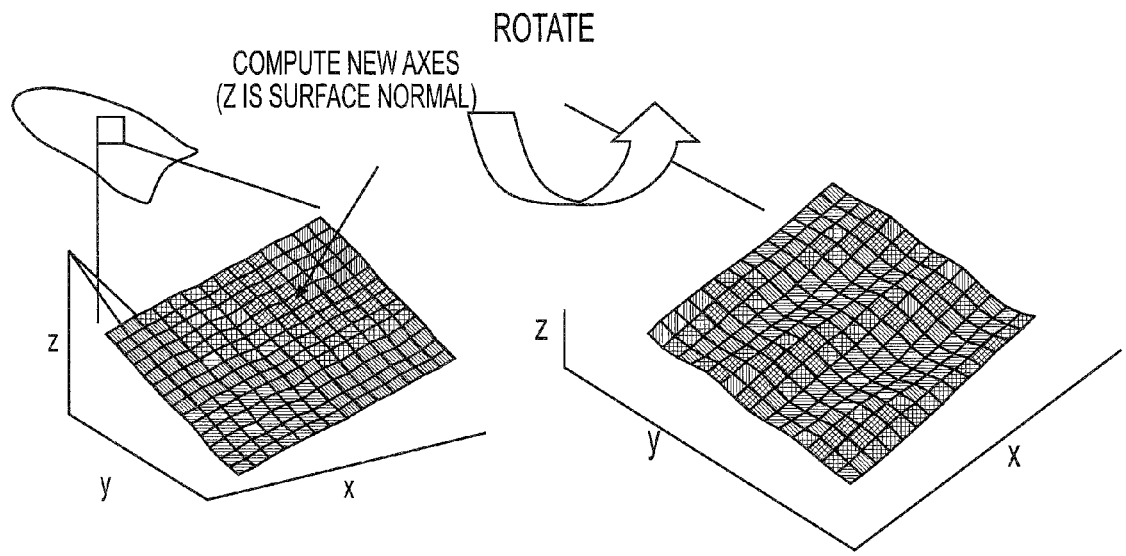
Figure 8D:
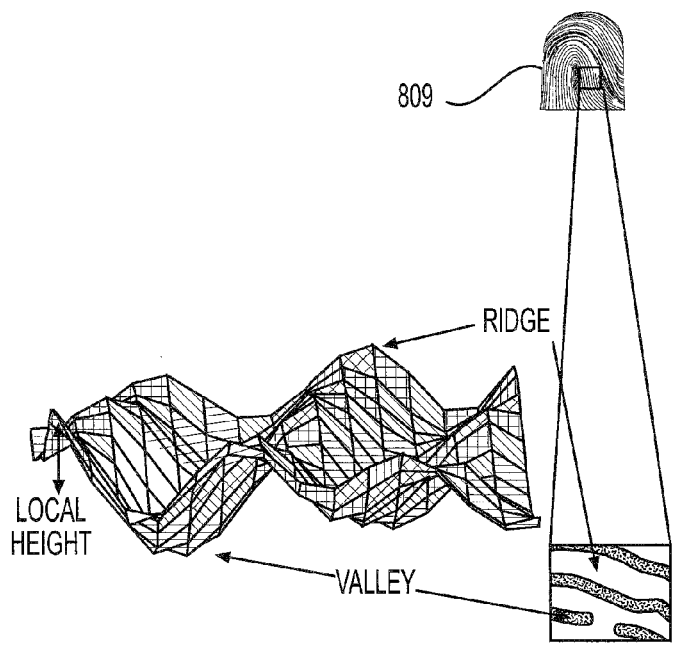

With reference now to FIG. 8A, shown is a diagram illustrating processing flow or process 800 for unrolling a 3D fingertip mesh and constructing a 2D fingerprint image (e.g., fingerprint unrolling 108) used in an embodiment of a system and method for extracting 2D fingerprint images from high resolution 3D surface data captured via contactless means. FIGS. 8B-8D illustrate intermediate results generated from processing the measured 3D hand data according to the method 800 illustrated in FIG. 8A. The fingerprint unrolling 108 component and process is described in detail below.

With continued reference to FIG. 8A, the fingerprint unrolling process 800 re-samples the vertices from the 3D mesh 801 and maps the re-sampled vertices to a uniform 2D grid, block 802. The re-sampling 802 is done in manner that, as a result of the re-sampling, all neighboring vertices are equidistant from one another (as shown in FIG. 8B). As each vertex is eventually mapped to a pixel in the final 2D fingerprint image, having an evenly distributed set of vertices preserves the relative 3D distances between minutiae. The vertices are then mapped 802 to a 2D grid where the rows and columns represent the vertical and horizontal adjacencies between the vertices. This grid representation makes it straightforward to operate on the vertices region by region, consequently enabling the efficient mapping of each vertex to a pixel in the final 2D image. FIG. 8B is a diagram graphically illustrating the re-sampling and mapping 802 and the results thereof.

Once the 3D vertices are re-sampled and mapped to a uniform grid 802, the vertices are then processed in a region by region fashion to produce the 2D fingerprint image, computing axes for the regional surfaces, block 804. The number of vertice regions that are processed in a region by region manner may be selected arbitrarily. In embodiments, the 3D mesh is arbitrarily divided into approximately equal-sized regions. For example, the 3D mesh may be divided into quadrants and the vertices of each quadrant processed in a quadrant by quadrant fashion. Alternatively, the 3D mesh may be divided in to more regions—e.g., eight (8), sixteen (16), thirty-two (32), sixty-four (64) and so on. Virtually any number of regions may be used. By dividing the 3D mesh into regions, embodiments can generate high-quality 2D fingerprint images even if portions of the 3D mesh image are low quality. The greater number of regions used, the more robust and higher-quality 2D fingerprint can be generated since distorted portions of the image may be limited to a smaller regions. In comparing the resultant 2D fingerprint image to stored fingerprints for matching purposes, the same number of regions may be used to divide and process the stored fingerprint, thereby matching on a region by region bases. In this manner, a match may be found even if regions with distortion or other poor-quality, in either the 2D fingerprint image created here and/or in the stored fingerprint, do not match. The trade-off of using more regions is that the processing time is necessarily increased. In embodiments, the number of regions used may be selectable by a user.

The 2D fingerprint image is constructed by observing the depth differences between the ridges and valleys. Since a local skin region is fairly small, it can be approximated as a planar surface with shallow ridges and valleys sitting on top. As a result, the depth of the ridges and valleys can be measured in the direction of the surface normal to the local skin region. To observe the shallow depth differences, a new coordinate system is computed for each region where the Z axis is the surface normal and the X, Y axes are parallel to the regional surface in the row and column directions.

Given the new axes for each regional surface, a transformation is determined that maps the regional surfaces to their new coordinate systems. This transformation rotates each region to the new axes, block 806. Depth differences between ridges and valleys are then extracted from the transformed regional surfaces. FIG. 8C is a diagram graphically illustrating the computation of axes for the regional surfaces 804 and rotating of the regions to the new axes 806.

At this point, a local height for each vertex is computed as its Z value minus the smallest Z value in the region and the pixel intensity is set from the computed local height, block 808. A full 2D fingerprint image 809 is created once all regions are processed. The resulting 2D fingerprint image 809 will have bright pixels values at fingerprint ridges and dark pixel values at fingerprint valleys. FIG. 8D is a diagram illustrating the computation of local height and setting of pixel intensity 808 and the final 2D fingerprint image 809. Lastly, in embodiments, a precise pixel size may be calculated from the range between the sensor and the fingertip (range can be supplied by an ultrasonic trigger) and the final fingerprint image may be scaled to a standard resolution (e.g., 500 pixels per inch).

Figure 9:
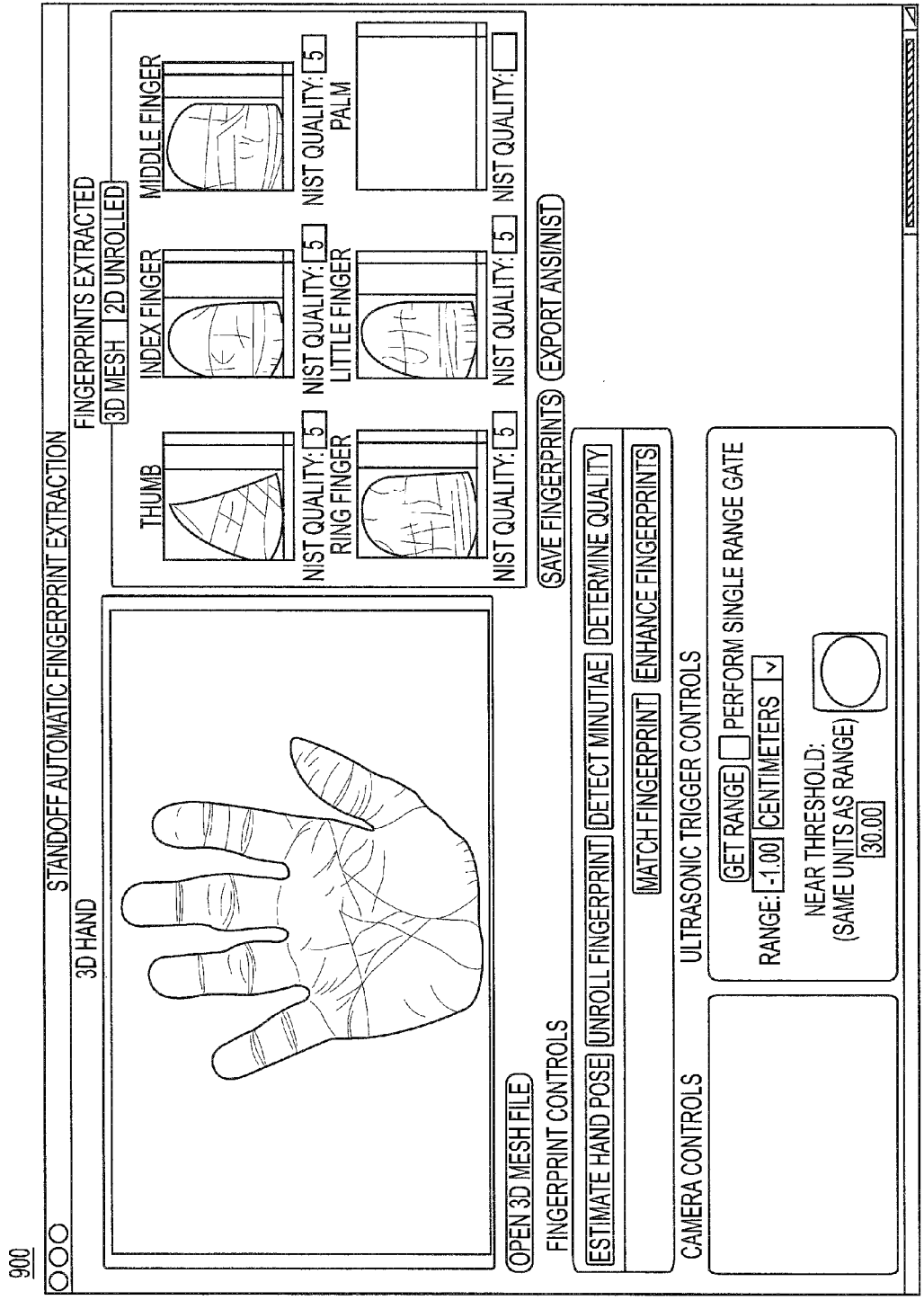
FIG. 9 is a screen shot of an embodiment of a graphical user interface that may be used to interface with in embodiments of a system and method for extracting two-dimensional fingerprints from high resolution three-dimensional surface data obtained from contactless, stand-off sensors.

With reference now to FIG. 9, shown is a graphical user interface (GUI) 900 for displaying results of an embodiment of a system and method for extracting 2D fingerprint images from high resolution 3D surface data captured via contactless means. For the results shown in the GUI 900, several sets of whole hand data were collected, each at different resolutions and varying hand poses. In a test of an embodiment of a system and method for extracting 2D fingerprint images from high resolution 3D surface data captured via contactless means, timing numbers were determined for major components of system including hand pose estimation 104 (see also FIGS. 4-5), fingertip ROI extraction 106 (see also FIG. 6), 2D unrolling 108 (see also FIGS. 8A-8D), and fingerprint quality and minutiae extraction 110. On average, the overall timing for these components was within 300 milliseconds. These timing numbers were generated on an Intel Xeon processor with four (4) cores. Modules implementing components 102-108, were implemented in C++ and were multi-threaded to take advantage of the multiple cores available in the processor. As such, each fingertip region was processed in parallel with the others. This significantly improved processing times.

Figure 10:
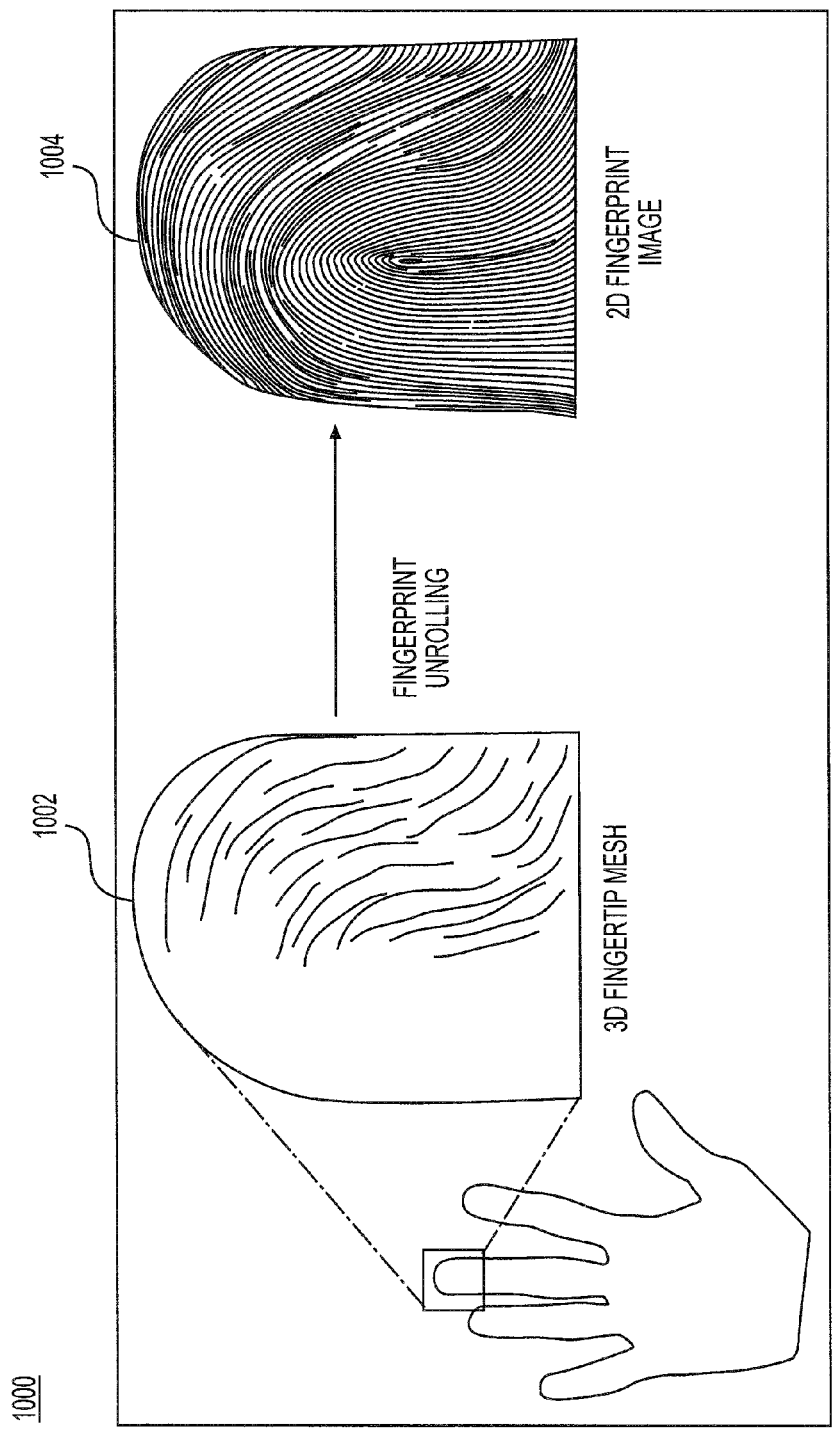
FIG. 10 is a diagram illustrating results of 3D fingerprint scanning and an extracted, unrolled 2D fingerprint image created by an embodiment of a system and method for extracting two-dimensional fingerprints from high resolution three-dimensional surface data obtained from contactless, stand-off sensors.

With reference now to FIG. 10, shown is an illustration that provides an example as to the resolution capability of an embodiment of a system and method for extracting 2D fingerprint images from high resolution 3D surface data captured via contactless means. As shown, a single fingertip region 1002 was extracted from a collected whole hand and unrolled into a 2D representation 1004.

Figure 11:
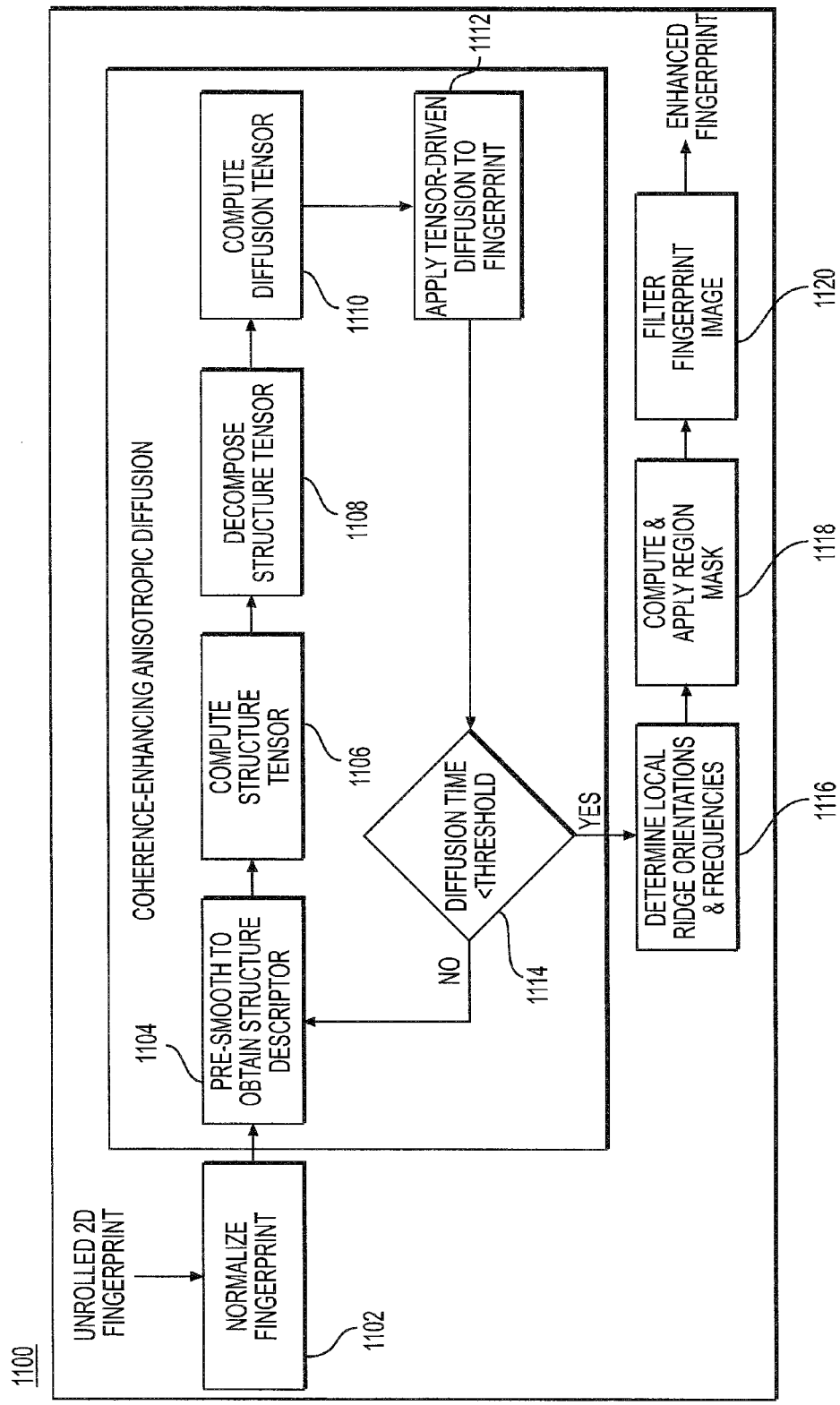
FIG. 11 is a flow diagram illustrating a method for fingerprint enhancement utilized by an embodiment of a system and method for extracting two-dimensional fingerprints from high resolution three-dimensional surface data obtained from contactless, stand-off sensors.

With reference now to FIG. 11 shown is method 1100 for fingerprint enhancement that may be utilized by embodiments of a system and method for extracting two-dimensional fingerprints from high resolution three-dimensional surface data obtained from contactless, stand-off sensors. described herein. Fingerprints are one of the most important biometrics used for identification purposes. A fingerprint consists of a pattern of ridges and furrows on the surface of the finger. The uniqueness of a fingerprint is determined by its local ridge characteristics, or minutiae, which are comprised of coordinate and orientation information. Most fingerprint recognition systems use minutiae as features to match for identification purposes. Therefore, fingerprint matching performance relies heavily on the quality of the fingerprint image. In order to ensure the performance of the disclosed system, embodiments utilize a fingerprint enhancement algorithm 1100 developed to improve the quality of the 2D unrolled fingerprints.

The disclosed enhancement method 1100 is a hybrid design based on "Anisotropic Diffusion in Image Processing," Weickert, J., Ph.D. Thesis, Dept. of Mathematics, University of Kaiserslautern, Germany (1996), pp. 42-43, 80-82, 107 and "Fingerprint image enhancement: Algorithm and performance evaluation," Hong, L., Wan, Y., and Jain, A. K., IEEE Transactions on Pattern Analysis and Machine Intelligence 20, 8 (1998), pp 777-789. Anisotropic diffusion filtering is a Partial Differential Equation (PDE) based image processing method that refers to a modified version of the heat equation in which the diffusivity is adapted to image features. CED is a method based on an anisotropic diffusion process whose activity is driven by a diffusion tensor. The diffusion tensor is specifically adapted to the fingerprint image in order to enhance coherent structures.

Figure 12:
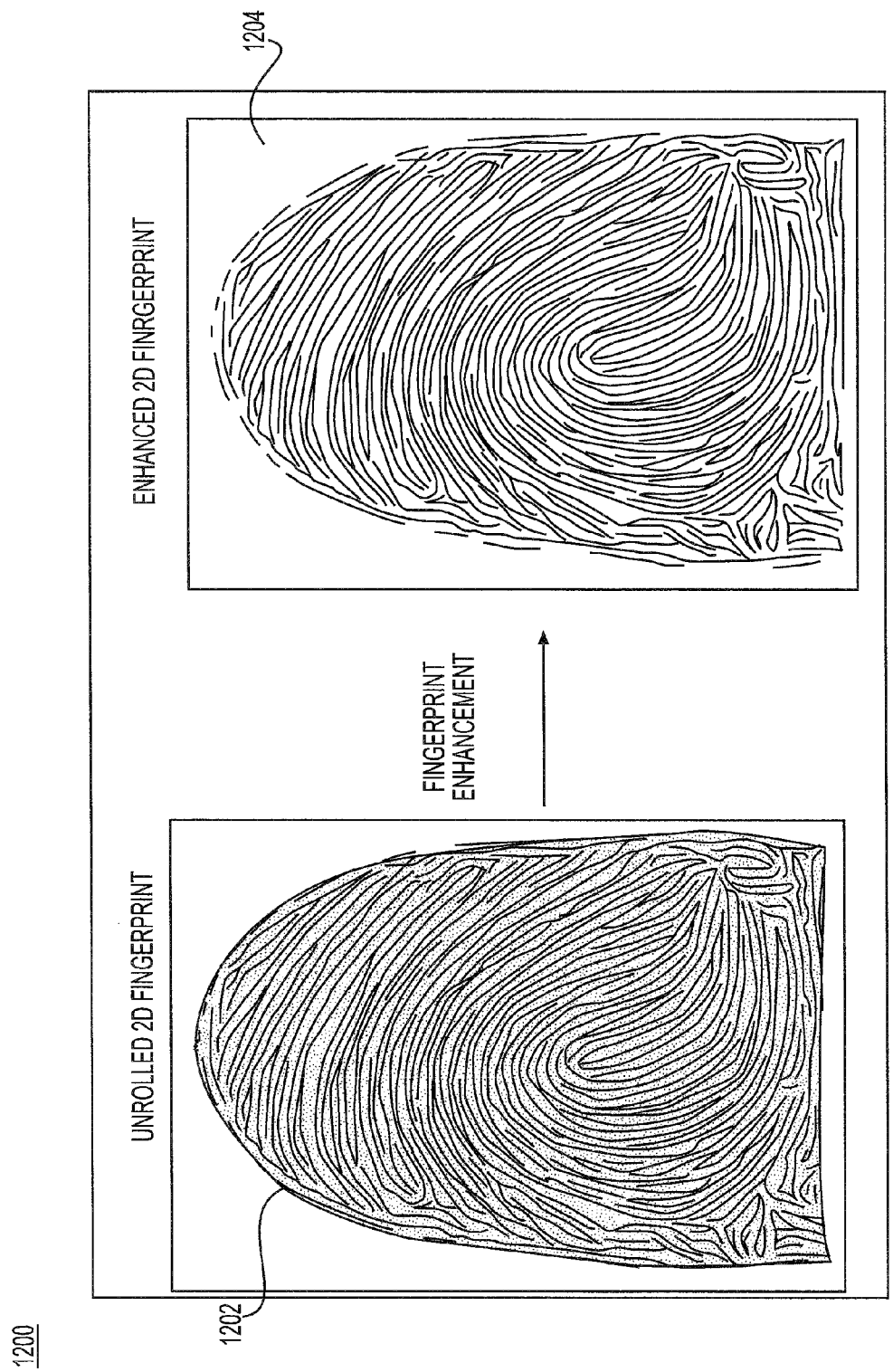
FIG. 12 is diagram illustrating an extracted, unrolled 2D fingerprint image and an enhanced 2D fingerprint image created by an embodiment of a system and method for extracting two-dimensional fingerprints from high resolution three-dimensional surface data obtained from contactless, stand-off sensors.

As shown in FIG. 11, in the CED process, method 1100 receives unrolled 2D fingerprint and normalizes this received fingerprint, block 1102. Method 1100 then smooths the normalized fingerprint, block 1104, and computes a structure tensor, block 1106. The structure tensor (see Eq. A below) identifies feature like corners that measure local coherence of image structures (accounting for how the gradient changes within a region of the fingerprint image). Convolving with a Gaussian kernel causes the structure tensor to be insensitive to noise. The structure tensor is then decomposed into an orthonormal basis of eigenvectors and corresponding eigenvalues, block 1108. The eigenvectors and eigenvalues of the structure tensor are then used to construct or compute the novel diffusion tensor, block 1110 (using, e.g., equation B below). Once the diffusion tensor is computed, it is applied to the fingerprint image, block 1112. If the diffusion time is determined to be less than a specified threshold parameter, block 1114 then the processes is repeated, providing a feedback loop to the nonlinear diffusion process in order to improve the edge detection results. Otherwise, the diffusion process is complete and the resulting smoothed fingerprint image is processed to determine fingerprint characteristics, such as: ridges, orientations and frequencies, block 1116. These characteristics are used to create a region mask that separates parts of the image that are too noisy to include in the filtering stage, block 1118. In the final stage of the enhancement method 1100, the fingerprint image is filtered using the frequency and orientation information from well-defined regions of the image in order to remove undesired noise, block 1120.

a.) $J_\rho(\nabla u_\sigma) := K_\rho * (\nabla u_\sigma \otimes \nabla u_\sigma) \quad (\rho \geq 0)$, where $K_\rho$ is a Gaussian kernel and $\nabla u_\sigma$ is a regularized gradient b.) $D(J_\rho(\nabla u_\sigma)) = (w_1 \mid w_2) \cdot \begin{pmatrix} \lambda_1 & 0 \\ 0 & \lambda_2 \end{pmatrix} \cdot \begin{pmatrix} w_1^T \\ w_2^T \end{pmatrix}$, where w1 and w2 are the eigenvectors of $J_\rho(\nabla u_\sigma)$ and $\lambda_1 = \alpha$ $\lambda_s = \begin{cases} \alpha & \text{If } j_{11} = j_{22} \text{ and } j_{12} = 0, \\ \alpha + (1-\alpha) \cdot e^{\frac{-1}{(j_{11}-j_{22})^2 + 4j_{12}^2}} & \text{else} \end{cases}$ With reference to FIG. 12, shown is a further illustration of the performance of an embodiment of a system and method for extracting 2D fingerprint images from high resolution 3D surface data captured via contactless means. Using an embodiment of the system, a fingerprint was extracted, unrolled to 2D, and enhanced. Shown is the unrolled fingerprint 1202 and the resulting enhanced 2D fingerprint 1204. The enhancement process utilized by embodiments may combine components from two existing enhancement approaches. These approaches are described in "Anisotropic Diffusion in Image Processing," Weickert, J., Ph.D. Thesis, Dept. of Mathematics, University of Kaiserslautern, Germany (1996), pp. 42-43, 80-82, 107 and "Fingerprint image enhancement: Algorithm and performance evaluation," Hong, L., Wan, Y., and Jain, A. K., IEEE Transactions on Pattern Analysis and Machine Intelligence 20, 8 (1998), pp 777-789. Distortions and noise are highly noticeable in the 3D mesh where the surface of the fingerprint curves around the finger. Due to this curvature, the sensor's resolution decreases in those regions and interpolated values are used to complete the data. However, as FIG. 12 illustrates, the disclosed fingerprint enhancement algorithm significantly improves those regions.

In order to validate embodiments of a system and method for extracting 2D fingerprint images from high resolution 3D surface data captured via contactless means, two major criteria were identified: the system must maintain sufficiently high quality throughout the 3D fingerprint extraction and 2D reconstruction process (i.e., clear, high-contrast ridges and valleys), and resulting 2D fingerprint images must produce higher scores when matched against corresponding ink prints versus other non-matching prints. In tests, a whole hand was collected and the resulting 2D fingerprint images were tested for image quality and were matched against a set of scanned ink fingerprints. Fingerprint image quality was computed by running the publicly available National Institute of Standards and Technology (NIST) Fingerprint Image Quality (NFIQ) software against the resulting fingerprint images. The fingerprint images produced by the disclosed system were all scored as "excellent" quality according to NFIQ; in general, fingerprints scored as "excellent" have a 99% true acceptance rate and less than 1% false acceptance rate.

In addition, processed fingerprints were compared to a set of twenty (20) scanned ink prints using the NIST minutia extraction and matching software. Test results indicate that the fingerprints correctly matched against the correct ink fingerprint with a match score of 52 or greater (the number of matching minutiae; a score higher than 40 gives a high probability of match). Match scores against incorrect ink prints were approximately 7. Although the tests were performed on a small set of data, the results demonstrate good potential for the disclosed approach's ability to produce high quality fingerprints that are compatible with fingerprints collected using traditional methods and current AFIS software.

Figure 13:
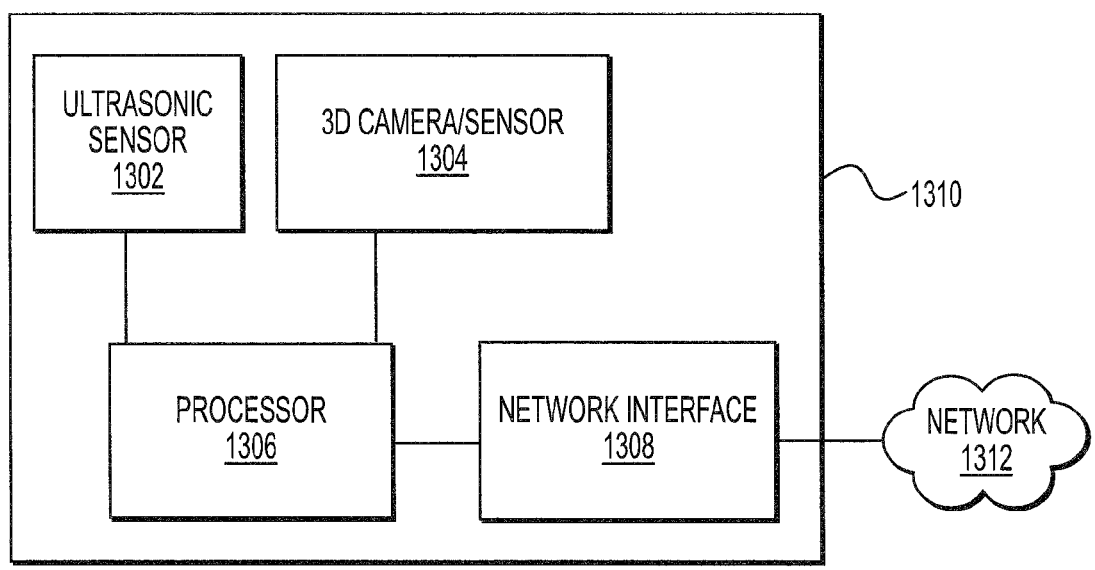
FIG. 13 is a block diagram illustrating components of an embodiment of a system for extracting two-dimensional fingerprints from high resolution three-dimensional surface data obtained from contactless, stand-off sensors.

With reference now to FIG. 13, shown is a block diagram illustrating components of an embodiment of a system 1300 for extracting two-dimensional fingerprints from high resolution three-dimensional surface data obtained from contactless, stand-off sensors. As discussed with reference to FIG. 3, embodiments of a system 1300 include an ultrasonic or other sensor 1302 for detecting presence of hand above 3D camera/sensor 1304. Detection of hand by sensor 1302 may trigger processor 1306 to turn on 3D camera/sensor 1304. 3D camera/sensor 1304 is a camera designed to take a high-resolution 3D image of a subjects fingers and hand. 3D camera/sensor 1304 may be, for example, a Photon-X camera. 3D camera/sensor 1304 may take 3D images through a glass or other transparent cover (not shown). 3D camera/sensor 1304 may transmit captured 3D images to processor 1306. System 1300 components may be contained within a protective case 1310.

Processor 1306 may perform processing necessary to execute methods/processes, and steps thereof, as described herein. Alternatively, processor 1306 may transmit 3D images through network interface 1308 via network 1312 to an external computing device (not shown) that executes methods/processes, and steps thereof, as described herein. Consequently, processor 1306 and/or external computing device may include system components described herein with reference to FIGS. 1-12. Such components may be instantiated as software modules, objects or other sub-components resident on memory (not shown) coupled with processor 1306 and executed by processor 1306. Alternatively, system 1300 may include multiple processors, one or more corresponding to one or more such components. If 3D images are processed as described with reference to FIGS. 1-12 by processor 1306 resulting 2D images may be output via network interface 1308 to an external computing device, e.g., for viewing through a GUI such as shown in FIG. 9.

With reference now to FIG. 14, shown is a block diagram illustrating exemplary components of a computing system 1400, such as processor 1306 or external computing system described with reference to FIG. 12. Consequently, computing or computer system 1400 includes a processor and related components. Computer system 1400 may include and execute one or more sub-system components to perform functions described herein, including steps of methods/processes described above. Computer system 1400 may connect with network 1412, e.g., Internet, or other network, to obtain and transmit data and information as described above.

Computer system 1400 typically includes a memory 1402, a secondary storage device 1404, and a processor 1406. Computer system 1400 may also include a plurality of processors 1406 and be configured as a plurality of, e.g., bladed servers, or other known server configurations. Computer system 1400 may also include an output device 1410. Memory 1402 may include RAM or similar types of memory, and it may store one or more applications for execution by processor 1406. Secondary storage device 1404 may include a hard disk drive, CD-ROM drive, or other types of non-volatile data storage. Memory 1402 and secondary storage 1404 are computer-readable media that may include instructions for controlling a computer system, such as computer system 1400, and a processor, such as processor 1406, to perform a particular method, such as methods described above.

Processor 1406 executes the application(s), such as sub-system component, which are stored in memory 1402 or secondary storage 1404, or received from the Internet or other network 1412. The processing by processor 1406 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with sub-system components.

Also, as noted, processor 1406 may execute one or more software applications in order to provide the functions described in this specification, specifically to execute and perform the steps and functions in the methods described above. Such methods and the processing may be implemented in software, such as software modules, for execution by computers or other machines. In an embodiment, processor 1406 may be a multi-core processor, such as an Intel Xeon processor with four (4) cores. Modules implementing sub-system components may be implemented in C++ and be multi-threaded to take advantage of the multiple cores available in the processor 1406. Output device 1410 may include any type of output device, such as a display, speakers, etc.

Computer system 1400 may represent processor 1406 and related components present in an embodiment of a system 1300 for extracting two-dimensional fingerprints from high resolution three-dimensional surface data obtained from contactless, stand-off sensors. Likewise, computer system 1400 may also represent external computer system connected to processor 1306 via network 1412. Computer system 1400 connects to network 1412 via network interface 1408.

As can be determined from the above, the system and method for extracting 2D fingerprint images from high resolution 3D surface data captured via contactless means has numerous advantages and points of novelty over the prior art. For example:

Captures Multiple Fingerprints with a Single Image Collection:

Embodiments are capable of capturing whole hand data from a single image collection. Because of this, all fingerprints on a hand can be extracted and processed at the same time. This reduces user interaction and significantly decreases processing times.

Allows the Subject to be at a Distance from the Sensor that Minimizes the Probability of Sensor Contact/Contamination:

Embodiments, using the Photon-X sensor, provide fingerprint collection of whole hand data from standoff distances of 1-2 feet (depending on the optics used). No other prior art can achieve those standoff distances, especially with whole hand data collections.

Imposes Little Constraint on the Subject (i.e., Collects Fingerprint Data as Long as Enough Finger Tips Face the Sensor):

As a subject places his/her hand in range of the disclosed system, the hand pose is determined. This pose information is then used to estimate the fingertip locations. Because of this, embodiments impose little constraint on the subject. This capability significantly decreases individual subject processing times, consequently increasing the volume of people that can be scanned at a given time. All prior art requires specific hand/finger placement, which renders those systems unusable for high traffic/volume use.

Allows for High Volume Use; it is Significantly Faster than Traditional Ink Collection and is Faster and More Flexible than Single Digit Touchless Collection Systems:

Embodiments collect whole hand data of a subject with few hand position constraints. Collecting whole hand data captures all fingerprints in a single image collection. There is no need to re-image each finger separately, as is the case with traditional ink collections and single digit touchless systems.

Captures the 3D Shape and Structure of the Entire Hand; this Data is Available for Further Processing and Exploitation and could be Useful as an Additional Biometric Feature:

Embodiments are capable of capturing high resolution 3D mesh representation of a whole hand. Because of this, other biometric features (palm prints) can be extracted and used for identification purposes. No other prior art has this capability.

Ridges and Valleys of the Fingertips are Extracted from True 3D Depth Information, Making it Robust to Discoloration (e.g., Ink on the Finger) of the Subject's Fingertips and Deception Methods:

Embodiments collect whole hand data in a single image collection and extracts the ridges and valleys of the fingertips from true 3D depth information, making the embodiments robust to discoloration of the subject fingertips and deception methods such as presenting the system with a fake fingerprint image.

Presents Minimal Opportunity for Accidental Contact with the Subject:

Embodiments have a standoff distance of 1-2 feet. In addition, due to the hand pose estimation capability, there are very few constraints imposed on the subject. Because of this, there are minimal instances for accidental contact. This capability becomes crucial for operational scenarios in which first responders are constrained by environmental or medical considerations that dictate a contactless fingerprint collection means. All known contactless approaches require exact placement of the finger in order to correctly image and process the fingerprint.

Sensor Independence is Ensured as Long as the Collection Sensor Generates and Supplies High Resolution 3D Mesh Data to the System:

Embodiments are not dependent on a single sensor technology. The disclosed processing algorithms will seamlessly integrate with any sensor technology capable of generating 3D mesh data. All prior art found rely on a specific sensor designs. This constrains each of those approaches to specific operational scenarios.

Enhances Fingerprint Images which Significantly Increases Fingerprint Matching Performance:

A novel fingerprint enhancement algorithm was developed that leverages the properties of thermodynamics to improve the quality of flow-like structures (fingerprint ridges) without destroying important singularities (minutiae). The disclosed hybrid approach combines components from two separate leading methods to achieve significantly improved results, most notably in regions of the fingerprints that are very noisy. This provides a significant increase in fingerprint quality, which directly translates to an increase in fingerprint matching performance.

Those of ordinary skill in the art will recognize that various modifications and variations may be made to the embodiments described above without departing from the spirit and scope of the present invention. It is therefore to be understood that the present invention is not limited to the particular embodiments disclosed above, but it is intended to cover such modifications and variations as defined by the following claims.

What is claimed is:

1. A system for extracting two-dimensional fingerprints from high resolution three-dimensional surface data obtained from contactless, stand-off sensors, comprising:
    a three-dimensional sensor that generates three-dimensional surface data of a hand and one or more fingers of a subject;
    a processor, coupled to the three-dimensional sensor, and a memory associated with the processor, wherein the processor executes instructions stored in the memory to extract two-dimensional fingerprints from high resolution three-dimensional surface data by:
        collecting three-dimensional surface data of the subject hand and one or more subject fingers generated by the three-dimensional sensor;
        estimating a hand pose of the subject based on the collected three-dimensional surface data;
        based on the estimated hand pose, extracting fingerprint information from the collected three-dimensional surface data;
        unrolling one or more two-dimensional fingerprints from the extracted fingerprint information;
        determining a fingerprint quality score for each of the one or more two-dimensional fingerprints; and
        for each of the one or more two-dimensional fingerprints that have at least a particular determined fingerprint quality score, storing the two-dimensional fingerprint.

2. The system of claim 1 wherein the three-dimensional sensor is a contactless, stand-off sensor in which the three-dimensional sensor generates the three-dimensional surface data without contacting the subject fingers.

3. The system of claim 1 wherein the three-dimensional sensor is a Photon-X sensor.

4. The system of claim 1 wherein the three-dimensional sensor generates three-dimensional surface data that includes a dense set of surface points, wherein each point samples a three-dimensional position as well as other attributes of the one or more subject fingers including surface normal information and color.

5. The system of claim 4 wherein the collecting three-dimensional surface data includes generating a triangulated, three-dimensional surface mesh from the dense surface point set.

6. The system of claim 5 wherein the triangulated, three-dimensional surface mesh includes a plurality of point vertices and triangular facets that provides a description of the surface geometry with a particular resolution to distinguish depth differences between ridges and valleys on a fingertip.

7. The system of claim 5 wherein the estimating a hand pose of the subject includes:
    extracting a three-dimensional contour of the subject hand from the triangulated, three-dimensional surface mesh; and
    performing a set of initial hand pose tests.

8. The system of claim 7 wherein the performing a set of initial hand pose tests includes:
    locating the hand thumb in the three-dimensional contour;
    verifying that the hand palm is facing towards the three-dimensional sensor;
    confirming that the three-dimensional contour does not intersect an edge of an edge of a field-of-view of the three-dimensional sensor except at the hand wrist; and
    determining that the three-dimensional contour is flat in the depth dimension.

9. The system of claim 5 wherein the unrolling one or more two-dimensional fingerprints includes:
    re-sampling vertices from the triangulated, three-dimensional surface mesh;
    mapping the re-sampled vertices to a uniform two-dimensional grid;
    computing axes for a regional surface for each region of the two-dimensional grid;
    rotating each region of the two-dimensional grid to the computed axis for the region;
    determining a local height for each pixel of the two-dimensional grid;
    setting a pixel intensity for each pixel of the two-dimensional grid based on the determined local height; and
    outputting the two-dimensional grid as the unrolled two-dimensional fingerprint.

10. The system of claim 1 further comprising enhancing the two-dimensional fingerprint.

11. The system of claim 1 further comprising an ultrasound sensor that detects when a subject hand is above the three-dimensional sensor, thereby causing the three-dimensional sensor to generate the three-dimensional surface data of a hand and one or more fingers of a subject.

12. The system of claim 1 wherein the system is portable and further comprises a carrying case that encloses the three-dimensional sensor, the processor and the memory.

13. A method for extracting two-dimensional fingerprints from high resolution three-dimensional surface data obtained from contactless, stand-off sensors, comprising:
    generating three-dimensional surface data of a hand and one or more fingers of a subject using a three-dimensional sensor;
    collecting three-dimensional surface data of the subject hand and one or more subject fingers generated by the three-dimensional sensor;
    estimating a hand pose of the subject based on the collected three-dimensional surface data;
    based on the estimated hand pose, extracting fingerprint information from the collected three-dimensional surface data;
    unrolling one or more two-dimensional fingerprints from the extracted fingerprint information;
    determining a fingerprint quality score for each of the one or more two-dimensional fingerprints; and
    for each of the one or more two-dimensional fingerprints that have at least a particular determined fingerprint quality score, storing the two-dimensional fingerprint.

14. The method of claim 13 wherein the generating three-dimensional surface data of the subject hand generates three-dimensional surface data that includes a dense set of surface points, wherein each point samples a three-dimensional position as well as other attributes of the one or more subject fingers including surface normal information and color.

15. The method of claim 14 wherein the collecting three-dimensional surface data includes generating a triangulated, three-dimensional surface mesh from the dense surface point set.

16. The method of claim 15 wherein the estimating a hand pose of the subject includes:
    extracting a three-dimensional contour of the subject hand from the triangulated, three-dimensional surface mesh; and
    performing a set of initial hand pose tests.

17. The method of claim 16 wherein the performing a set of initial hand pose tests includes:
    locating the hand thumb in the three-dimensional contour;
    verifying that the hand palm is facing towards the three-dimensional sensor;
    confirming that the three-dimensional contour does not intersect an edge of an edge of a field-of-view of the three-dimensional sensor except at the hand wrist; and
    determining that the three-dimensional contour is flat in the depth dimension.

18. The method of claim 15 wherein the unrolling one or more two-dimensional fingerprints includes:
    re-sampling vertices from the triangulated, three-dimensional surface mesh;
    mapping the re-sampled vertices to a uniform two-dimensional grid;
    computing axes for a regional surface for each region of the two-dimensional grid;
    rotating each region of the two-dimensional grid to the computed axis for the region;
    determining a local height for each pixel of the two-dimensional grid;
    setting a pixel intensity for each pixel of the two-dimensional grid based on the determined local height; and
    outputting the two-dimensional grid as the unrolled two-dimensional fingerprint.

19. The method of claim 13 further comprising enhancing the two-dimensional fingerprint.

20. The method of claim 13 further comprising detecting when a subject hand is above the three-dimensional sensor, thereby causing the generating of the three-dimensional surface data of a hand and one or more fingers of a subject.

21. The system of claim 1 wherein the three-dimensional surface data of the subject hand includes an anterior side of the subject hand.

22. The method of claim 13 wherein the three-dimensional surface data of the subject hand includes an anterior side of the subject hand.

23. A system for extracting two-dimensional fingerprints from high resolution three-dimensional surface data obtained from contactless, stand-off sensors, comprising:
    a three-dimensional sensor that generates three-dimensional surface data of a hand and one or more fingers of a subject;
    a processor, coupled to the three-dimensional sensor, and a memory associated with the processor, wherein the processor executes instructions stored in the memory to extract two-dimensional fingerprints from high resolution three-dimensional surface data by:
        collecting three-dimensional surface data of the subject hand and one or more subject fingers generated by the three-dimensional sensor;
        estimating a hand pose of the subject based on the collected three-dimensional surface data;
        extracting a three-dimensional contour of the subject hand based on the three-dimensional surface data;
        confirming that the three-dimensional contour does not intersect an edge of a field-of-view of the three-dimensional sensor except at a hand wrist;
        based on the estimated hand pose, extracting fingerprint information from the collected three-dimensional surface data;
        unrolling one or more two-dimensional fingerprints from the extracted fingerprint information;
        determining a fingerprint quality score for each of the one or more two-dimensional fingerprints; and
        for each of the one or more two-dimensional fingerprints that have at least a particular determined fingerprint quality score, storing the two-dimensional fingerprint.

24. A method for extracting two-dimensional fingerprints from high resolution three-dimensional surface data obtained from contactless, stand-off sensors, comprising:
    generating three-dimensional surface data of a hand and one or more fingers of a subject using a three-dimensional sensor;
    collecting three-dimensional surface data of the subject hand and one or more subject fingers generated by the three-dimensional sensor;
    estimating a hand pose of the subject based on the collected three-dimensional surface data;
    extracting a three-dimensional contour of the subject hand based on the three-dimensional surface data;
    confirming that the three-dimensional contour does not intersect an edge of a field-of-view of the three-dimensional sensor except at a hand wrist;
    based on the estimated hand pose, extracting fingerprint information from the collected three-dimensional surface data;
    unrolling one or more two-dimensional fingerprints from the extracted fingerprint information;
    determining a fingerprint quality score for each of the one or more two-dimensional fingerprints; and
    for each of the one or more two-dimensional fingerprints that have at least a particular determined fingerprint quality score, storing the two-dimensional fingerprint.

* * * * *